(12) United States Patent
Sevrey et al.

(10) Patent No.: US 11,553,641 B2
(45) Date of Patent: Jan. 17, 2023

(54) DUAL-IMPELLER SPREADER WITH DUAL SHUT-OFF CONTROLS

(71) Applicant: Earthway Products Inc, Bristol, IN (US)

(72) Inventors: Richard Sevrey, Bristol, IN (US); Justin B Parizek, Millersburg, IN (US); Casey Martin, South Bend, IN (US); John Marshall, Granger, IN (US); Tim Jones, Osceola, IN (US)

(73) Assignee: Earthway Products Inc, Bristol, IN (US)

( * ) Notice: Subject to any disclaimer, the term of this patent is extended or adjusted under 35 U.S.C. 154(b) by 325 days.

(21) Appl. No.: 16/598,139

(22) Filed: Oct. 10, 2019

(65) Prior Publication Data

US 2020/0188947 A1 Jun. 18, 2020

Related U.S. Application Data

(60) Provisional application No. 62/781,433, filed on Dec. 18, 2018.

(51) Int. Cl.
*A01C 17/00* (2006.01)
*A01C 21/00* (2006.01)
(Continued)

(52) U.S. Cl.
CPC ............ *A01C 17/001* (2013.01); *A01C 7/085* (2013.01); *A01C 17/008* (2013.01); *A01C 21/00* (2013.01);
(Continued)

(58) Field of Classification Search
CPC ..... A01C 17/001; A01C 7/085; A01C 17/008; A01C 21/00; B05B 3/1057; B05B 12/002; E01H 10/007
(Continued)

(56) References Cited

U.S. PATENT DOCUMENTS 2,594,084 A * 4/1952 Skibbe ................. A01C 17/006
239/661
3,114,481 A * 12/1963 West ...................... A63C 19/08
222/138
(Continued)

FOREIGN PATENT DOCUMENTS

| GB | 2100565 A | 12/1981 |
| WO | 2005/107431 A1 | 11/2005 |
| WO | 2018/156958 A1 | 8/2018 |

OTHER PUBLICATIONS

Search Report for related Great Britain Patent Application No. GB2000596.3, dated Jul. 15, 2020, 4 pages.
(Continued)

*Primary Examiner* — Chee-Chong Lee
(74) *Attorney, Agent, or Firm* — Hovey Williams LLP; Kameron D. Kelly

(57) ABSTRACT

A dual-impeller spreader capable of independently a flow-rate of particulate material about two halves of the spreader's coverage area. The spreader includes a frame, a hopper, and wheels rotatably connected to the frame via an axle. A first impeller is fixed to a first impeller shaft rotatably coupled to the axle via a first gear train, and a second impeller is fixed to a second impeller shaft rotatably coupled to the axle via a second gear train. A first shut-off control selectively opens and closes a first set of hopper exit openings located above the first impeller, while a second shut-off control selectively opens and closes a second set of hopper exit openings located above the second impeller. The first shut-off control and the second shut-off control selectively open and close the respective openings independent of each other.

8 Claims, 19 Drawing Sheets

(51) Int. Cl.
    *E01H 10/00*     (2006.01)
    *A01C 7/08*     (2006.01)
    *B05B 3/10*     (2006.01)
    *B05B 12/00*     (2018.01)

(52) U.S. Cl.
    CPC .......... *B05B 3/1057* (2013.01); *B05B 12/002* (2013.01); *E01H 10/007* (2013.01)

(58) Field of Classification Search
    USPC .......................................................... 239/7
    See application file for complete search history.

(56) References Cited

U.S. PATENT DOCUMENTS

| | | | |
|---|---|---|---|
| 4,597,531 A * | 7/1986 | Kise | A01C 17/006 239/650 |
| 5,203,510 A | 4/1993 | Courtney et al. | |
| 6,047,909 A * | 4/2000 | Simpson | A01C 15/006 239/600 |
| 8,074,904 B1 * | 12/2011 | Hobbs | A01C 17/006 239/668 |
| 2002/0162907 A1 | 11/2002 | Courtney | |
| 2016/0106028 A1 | 4/2016 | Kendall et al. | |

OTHER PUBLICATIONS

KSAB Utemiljo for aktiva liv, KSAB Duo Super Spreader, DUO Godningsspridare, https://shop.ksabgolf.se/vara-produkter/for-golfbanan/greenkeeperutrustning/ovrigt-underhall/ksab-duo-super-spreader, 2 pages.

* cited by examiner

DUAL-IMPELLER SPREADER WITH DUAL SHUT-OFF CONTROLS

CROSS-REFERENCE TO RELATED APPLICATIONS

This application claims the benefit of priority to U.S. Provisional Patent Application Ser. No. 62/781,433, filed Dec. 18, 2018, and entitled "Material Spreader," which is hereby incorporated by reference in its entirety.

TECHNICAL FIELD

The present invention relates to a particulate dispersing apparatus and, more specifically, to a dual-impeller granular spreader with dual shut-off controls.

BACKGROUND OF THE INVENTION

Many different types of broadcast spreaders are used to distribute particulate material or granules such as fertilizer, grass seed, salt, sand, ice melt, and others to lawns, golf courses, turf, sidewalks, parking lots, and various other surfaces. The rolling types of such spreaders generally include a hopper attached to a rolling frame, one or more openings within the bottom of the hopper, a shut-off plate below the one or more openings that selectively opens and closes the exit openings in the bottom of the hopper, and an impeller directly below the shut-off plate that spins and thus distributes granules falling on the impeller as the spreader rolls along a surface. During operation, a user controls the distribution of the granules via a shut-off control that selectively opens and closes the shut-off plate thus permitting or obstructing, respectively, the granules from flowing through the openings and onto the impeller.

The impeller is operatively connected via a gear train or the like to wheels of the rolling frame such that as the spreader rolls, the impeller also turns, flinging and spreading the granules across a lawn, golf course, turf, sidewalk, parking lot, or other surface. However, these conventional spreaders have known deficiencies in that the single impeller limits the amount of granules that may be distributed and provides limited flexibility and customizability regarding the spread pattern used to distribute the granules. Thus, these conventional spreaders have proved ineffective in certain applications, particularly in commercial settings where prescription fertilizers and other expensive particulates are routinely used, the application of which must be strictly controlled.

Some spreader manufacturers have attempted to overcome one or more shortcomings of these single-impeller spreaders by implementing a dual, side-by-side impeller configuration. For example, U.S. Pat. No. 5,203,510 and PCT Application Publication No. WO 2018/156958 describe dual impellers below a hopper of a spreader. But these spreaders cannot accurately control the spread pattern dispersed from the dual impellers and thus are unsuitable for applications where the spreader pattern needs to be customizable or otherwise controlled.

WO 2018/156958 attempts to control the spread pattern somewhat by deploying a deflector that, when activated, impedes particulate material from exiting out one side of the spreader. Thus, any material dispersed in the spread pattern is impeded from spreading onto non-lawn areas. But this deflector simply deflects the dispensed material back toward the lawn area without otherwise controlling granule flowrate. Thus, if the deflector is activated, the amount of material directed onto the lawn is more than the recommended amount since the deflected material also exits the side of the spreader opposite that of the deflector. This leads to over treatment of the lawn and to wasted product.

There thus remains a need for a spreader exhibiting the increased coverage area and particulate flowrate benefits of a dual-impeller spreader but which can accurately control the amount and direction of particulate flowing from the spreader.

BRIEF SUMMARY OF THE INVENTION

The instant invention is generally directed to a dual-impeller spreader with dual shut-off controls that overcomes the deficiencies of the spreaders discussed above.

More particularly, some embodiments of the instant invention are directed to a broadcast spreader that generally includes a frame, a hopper connected to the frame that is configured to hold particulate material to be spread about a surface, and wheels rotatably connected to the frame via an axle and configured to roll along the surface. The broadcast spreader may include a first impeller shaft rotatably coupled to the axle via a first gear train with a first impeller fixedly coupled to the first impeller shaft and configured to rotate with the first impeller shaft, and a second impeller shaft rotatably coupled to the axle via a second gear train with a second impeller fixedly coupled to the second impeller shaft and configured to rotate with the second impeller shaft. A first shut-off control selectively opens and closes a first plurality of openings provided in the hopper above the first impeller, while a second shut-off control selectively opens and closes a second plurality of openings provided in the hopper above the second impeller. The first shut-off control and the second shut-off control are configured to selectively open and close the first plurality of openings and the second plurality of openings, respectively, independent of each other.

Other embodiments are directed to a dual-impeller spreader configured to independently spread particulate material about two halves of the dual-impeller spreader's coverage area. The dual-impeller spreader may include similar features as discussed above, and additionally may include a push handle extending upright and rearward from the frame, which is grasped by a user during operation of the dual-impeller spreader. The first shut-off control may be mounted to a right side of the push handle, while the second shut-off control mounted to a left side of the push handle.

Still other embodiments may be directed to a method of operating a broadcast spreader. The method includes providing a broadcast spreader similar to that discussed above, including a frame, a hopper connected to the frame and configured to hold particulate material to be spread about a surface, wheels rotatably connected to the frame via an axle and configured to roll along the surface, a first impeller shaft rotatably coupled to the axle via a first gear train, a first impeller fixedly coupled to the first impeller shaft and configured to rotate with the first impeller shaft, a second impeller shaft rotatably coupled to the axle via a second gear train, a second impeller fixedly coupled to the second impeller shaft and configured to rotate with the second impeller shaft, a first shut-off control configured to selectively open and close a first plurality of openings provided in the hopper above the first impeller, and a second shut-off control configured to selectively open and close a second plurality of openings provided in the hopper above the second impeller. The method may further include adjusting a spread pattern of the dual-impeller spreader by operating the first shut-off control and second shut-off control independent of each other.

These and other features will be discussed in more detail in connection with the accompanying drawings.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

Figure 1:
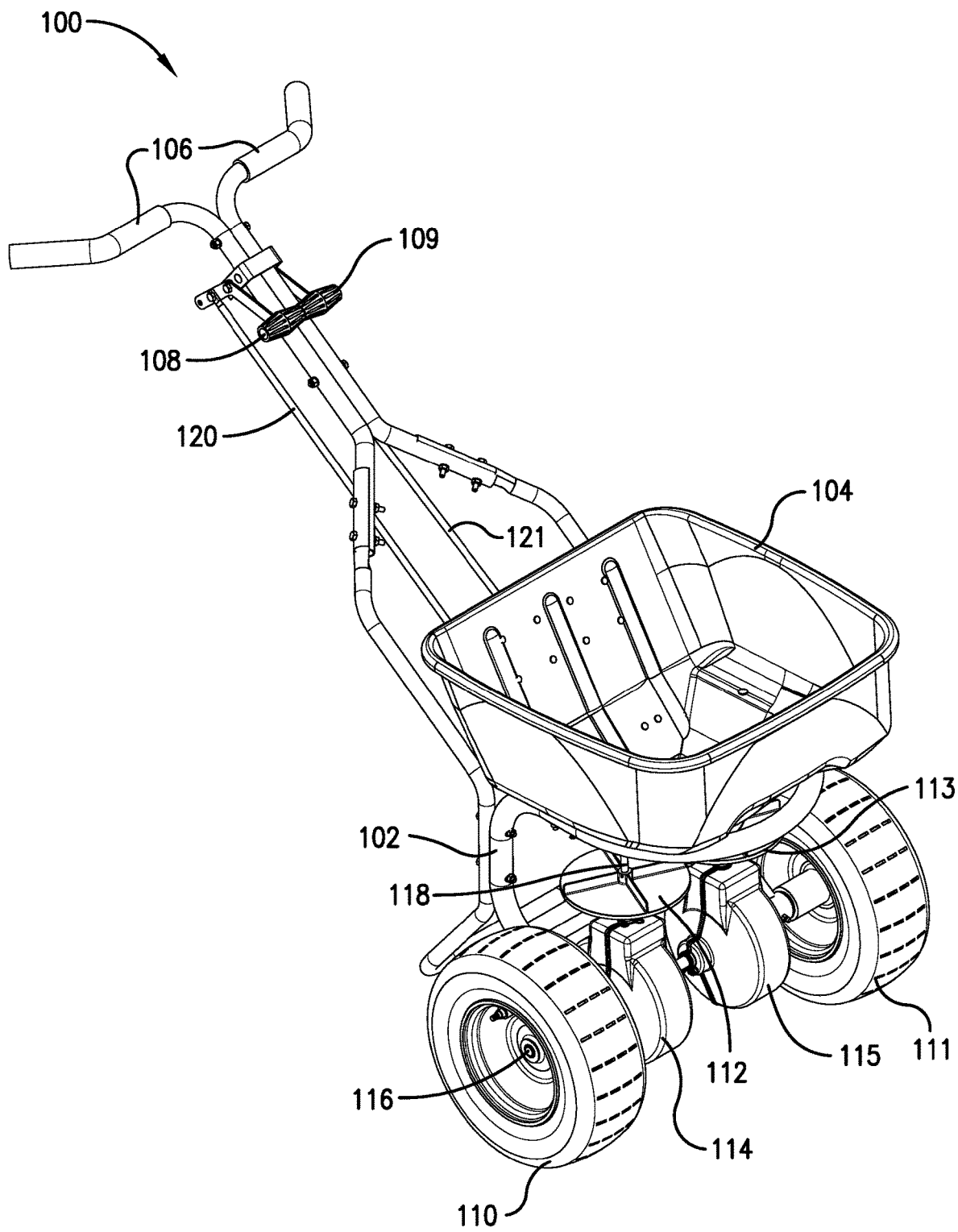
FIG. 1 is a front perspective view of a dual-impeller spreader according to one embodiment of the invention.
Figure 2:
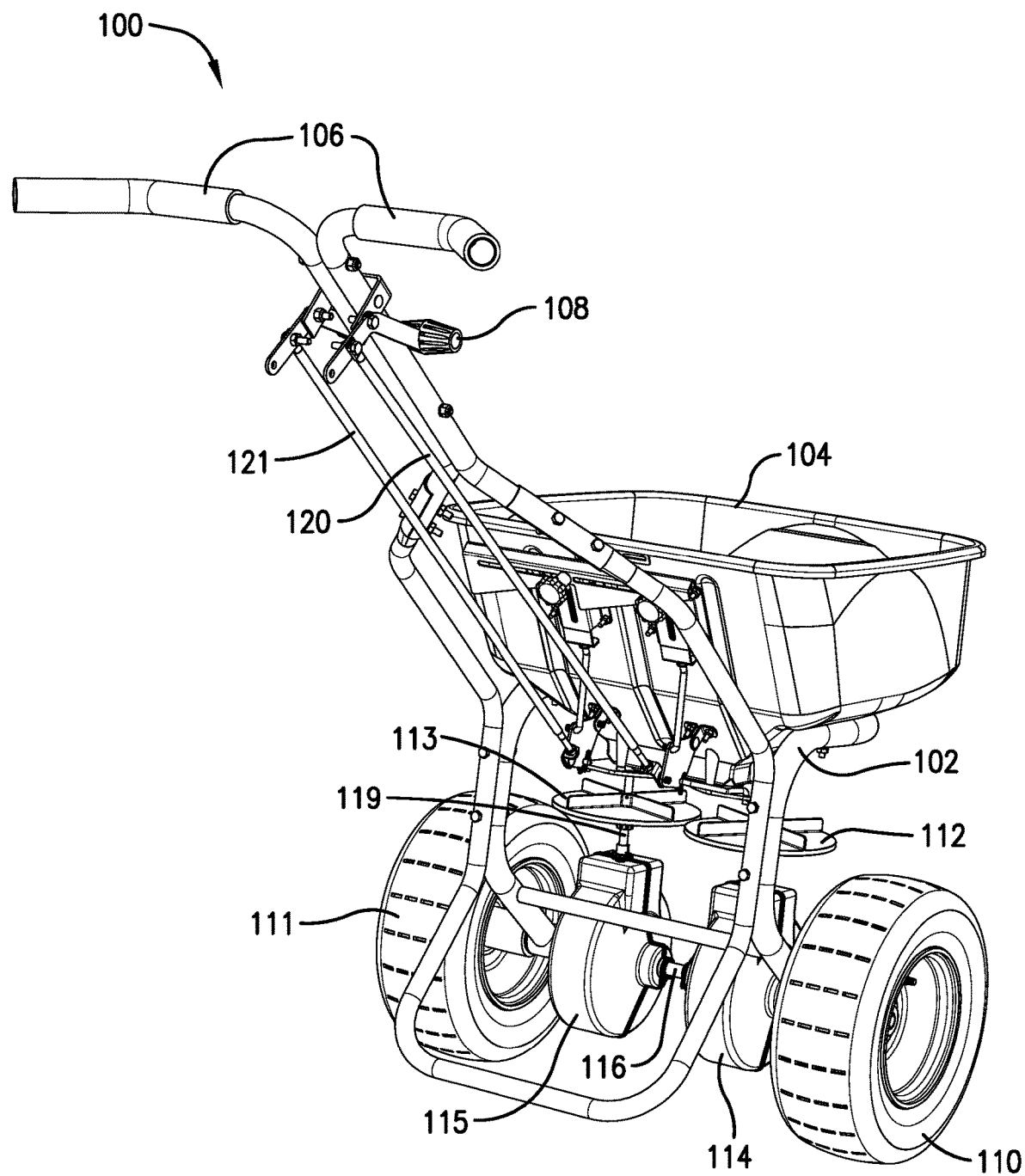
FIG. 2 is a rear perspective view of the dual-impeller spreader shown in FIG. 1.
Figure 3:
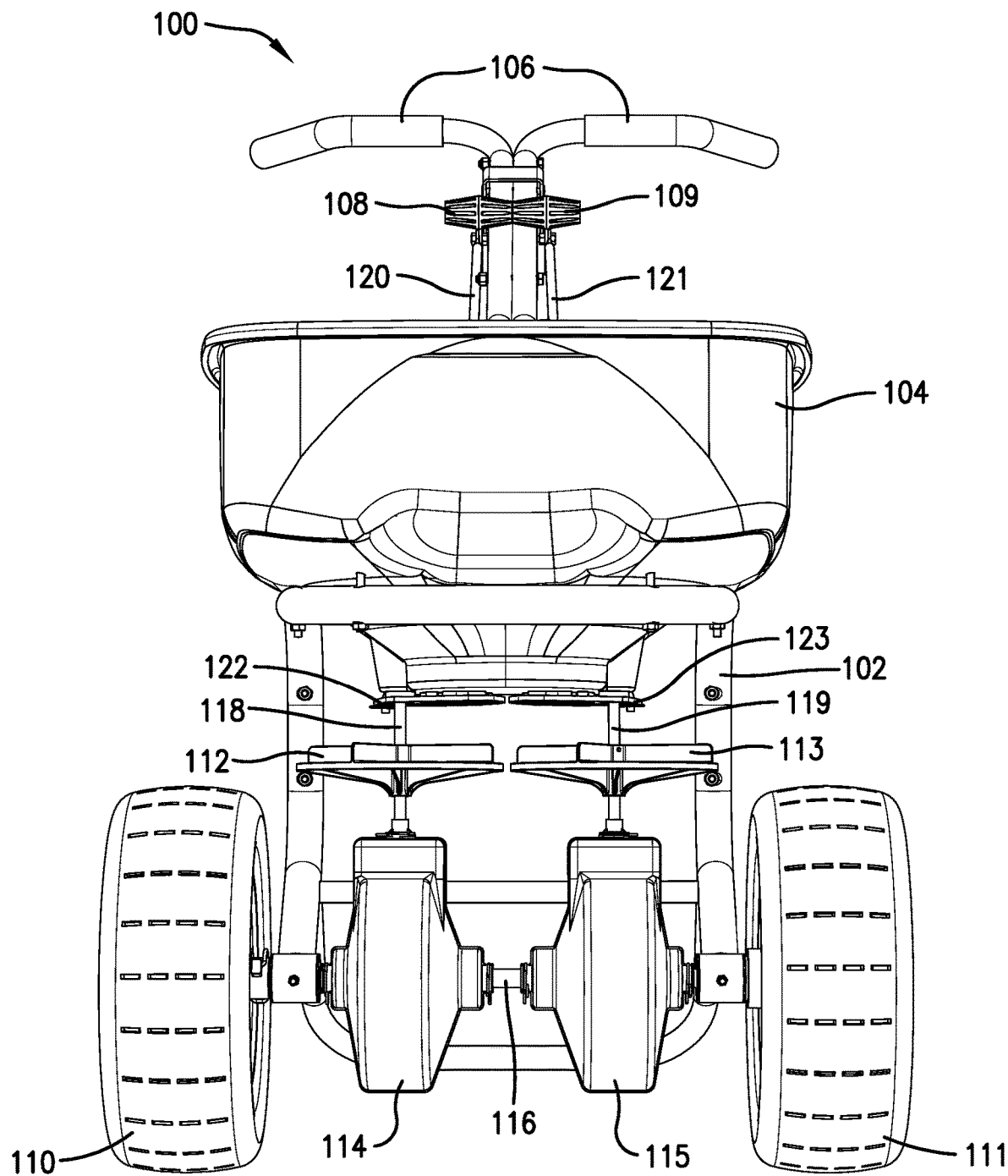
FIG. 3 is a front view of the dual-impeller spreader shown in FIGS. 1-2.

At a high level, the subject matter of this application generally relates to walk-behind and other spreaders used to distribute granules such as fertilizer, grass seed, and other grass treatments on lawns, golf courses, and other turf, or used to distribute granules such as salt, sand, ice melt, and others on a variety of surfaces. The spreader includes an innovative dual-impeller design with dual shut-off controls allowing a user to customize the spread pattern and material flowrates to tailor the particulate material application to the specific task at hand. These features will become more readily apparent in the following discussion.

FIGS. 1-7 generally show a particulate material dispersing apparatus or dual-impeller spreader 100 according to some aspects of the invention, while FIGS. 8-15 shows various aspects of the dual-impeller spreader 100 in greater detail and FIGS. 16-19 illustrate some of the customizable spread patterns achievable using the dual-impeller spreader 100. The dual-impeller spreader 100 may be any type of particulate dispersing apparatus capable of dispersing particulate and/or granular material, such as but not limited to lawn seed or fertilizer, salt, sand, ice melt, and other material. The example dual-impeller spreader 100 generally shown in FIGS. 1-7 is a walk behind spreader, but in other embodiments the features described herein could be employed on other types of particulate dispersing apparatuses including, for example, a hand-held spreader and a tow-type spreader, among others.

The dual-impeller spreader 100 includes a frame 102, a vessel or hopper 104 mounted to the frame 102, and a push handle 106 mounted to and extending upright and rearward from the frame 102. Attached to the push handle 106 near a distal end thereof (i.e., an end of the push handle 106 farthest from the hopper 104, which is held by a user during operation) are a plurality of shut-off controls 108, 109. A first shut-off control 108 is attached to a right side of the push handle 106, and a second shut-off control 109 is attached to a left side of the push handle 106. As used herein, "right" and "left" refer to the right and left sides of the dual-impeller spreader 100 when the spreader 100 is viewed from behind; i.e., from the view shown in FIG. 4. Put another way, right and left herein correspond to a user's right and left side when operating the dual-impeller spreader 100. The shut-off controls 108, 109 independently open and close openings in a bottom of the hopper 104, thus permitting or restricting material contained within the hopper 104 from exiting the hopper 104, which will be explained in more detail below.

Attached to a lower portion of the frame 102 via an axle 116 is a pair of wheels 110, 111, with a first wheel 110 at the right end of the axle 116 and a second wheel at the left end of the axle 116. Operatively connected to the axle 116 between the wheels 110, 111 is a first gear box 114 and a second gear box 115. As will be explained in more detail below, the gear boxes 114, 115 include internal gear trains (FIG. 15) that turn a pair of impellers 112, 113 as the dual-impeller spreader 100 rolls along a surface. The first gear box 114 is operatively connected to a first impeller shaft 118 and the second gear box 115 is operatively connected to a second impeller shaft 119. Fixedly mounted to the first impeller shaft 118 and the second impeller shaft 119 is the first impeller 112 and the second impeller 113, respectively. As the wheels 110, 111 roll along a surface (e.g., a lawn or other turf), the first impeller shaft 118 turns the corresponding first impeller 112, and the second impeller shaft 119 turns the corresponding second impeller 113.

Figure 14:
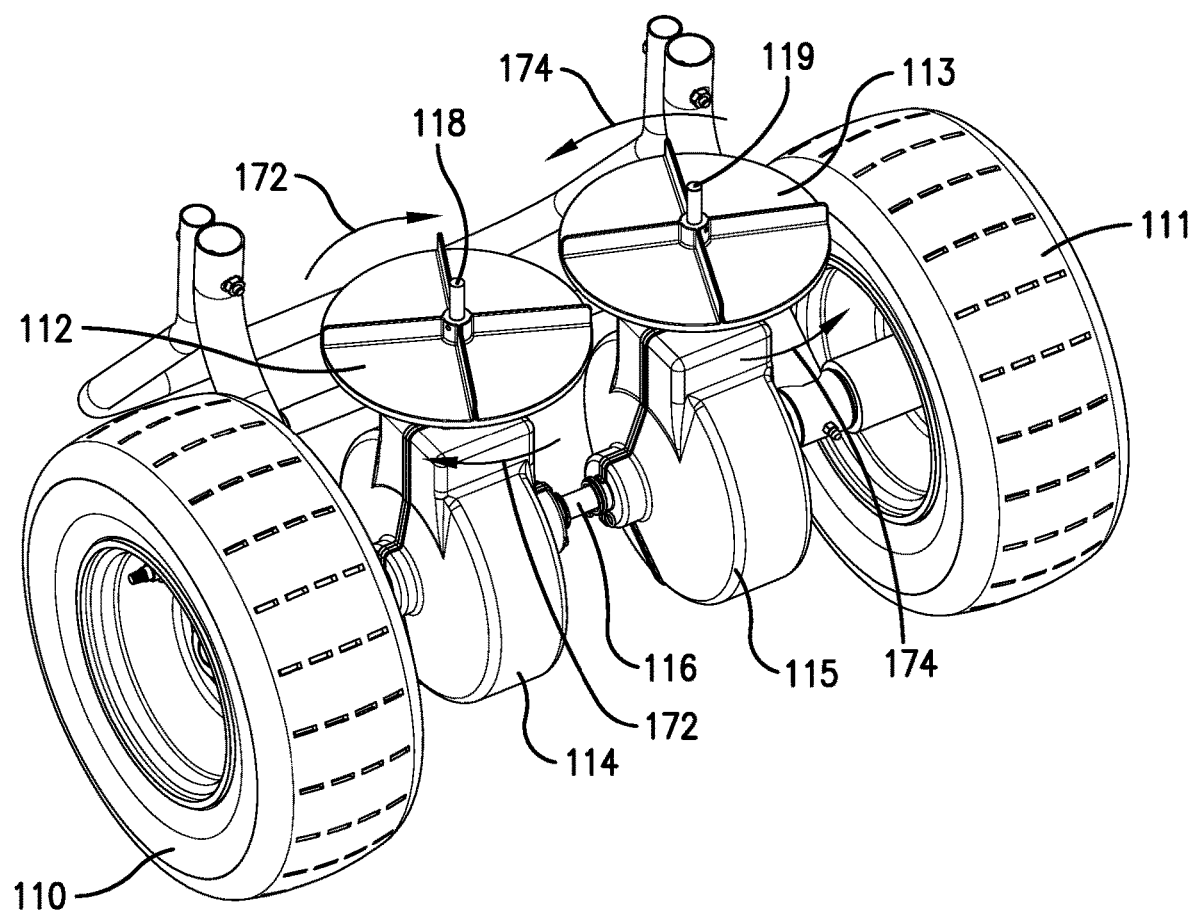
FIG. 14 is a close-up perspective view of the dual-impeller assembly of the dual-impeller spreader shown in FIGS. 1-7.

As best seen in FIG. 14, each impeller 112, 113 includes a plurality of upstanding fins configured to engage, and thus fling (spread), granules or other particulate falling thereon when the impellers 112, 113 are spinning. Each impeller shaft 118, 119 extends through a respective opening in the bottom of the hopper 104 and terminates inside of the hopper 104, and, in some embodiments, are operatively connected to one or more agitators 124 (FIG. 6) provided therein. The agitator(s) 124 may spin, oscillate, or otherwise move within the hopper 104 to assist with channeling granular material through a plurality of openings 126, 127 provided in the bottom of the hopper 104, discussed more fully below.

Pivotally mounted about each impeller shaft 118, 119 is a shut-off adjustment plate 122, 123. More particularly, a first shut-off adjustment plate 122 is pivotally mounted about the first impeller shaft 118, and is operatively connected to the first shut-off control 108 via a first control rod assembly 120, while a second shut-off adjustment plate 123 is pivotally mounted about the second impeller shaft 119, and is operatively connected to the second shut-off control 109 via a second control rod assembly 121.

Figure 4:
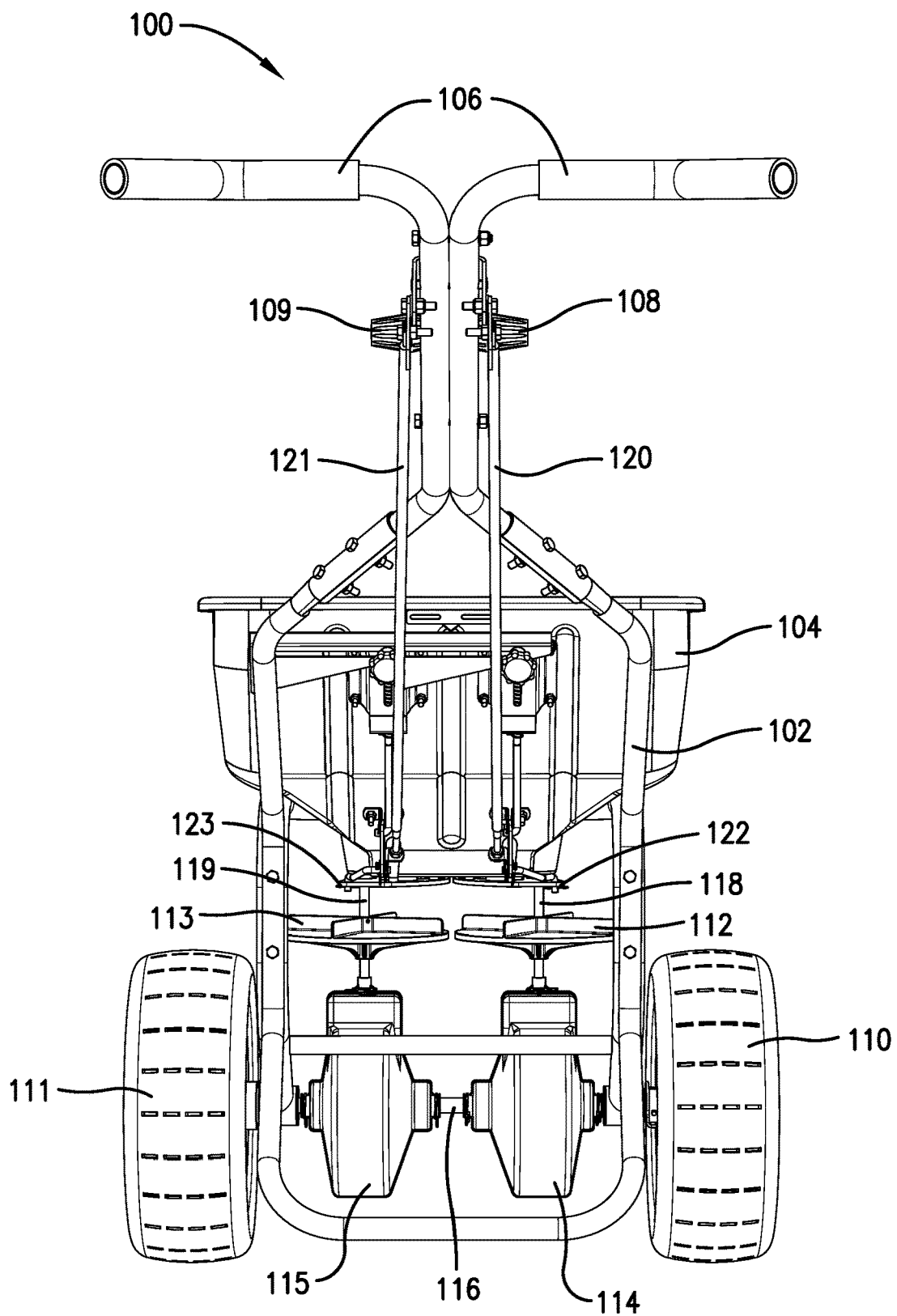
FIG. 4 is rear view of the dual-impeller spreader shown in FIGS. 1-3.
Figure 5:
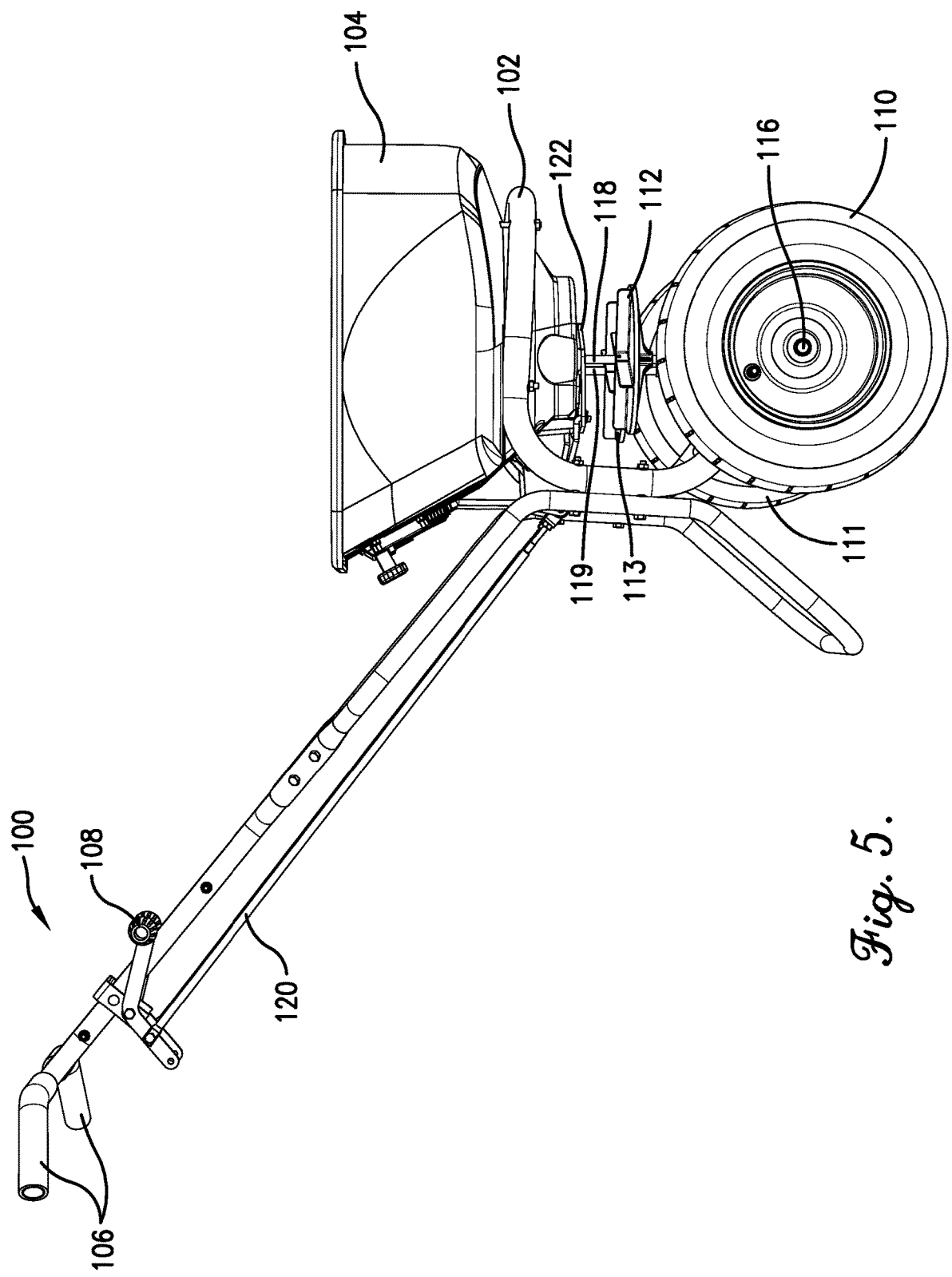
FIG. 5 is a right-side view of the dual-impeller spreader shown in FIGS. 1-4, with a left-side view of the dual-impeller spreader being a mirror image thereof.
Figure 6:
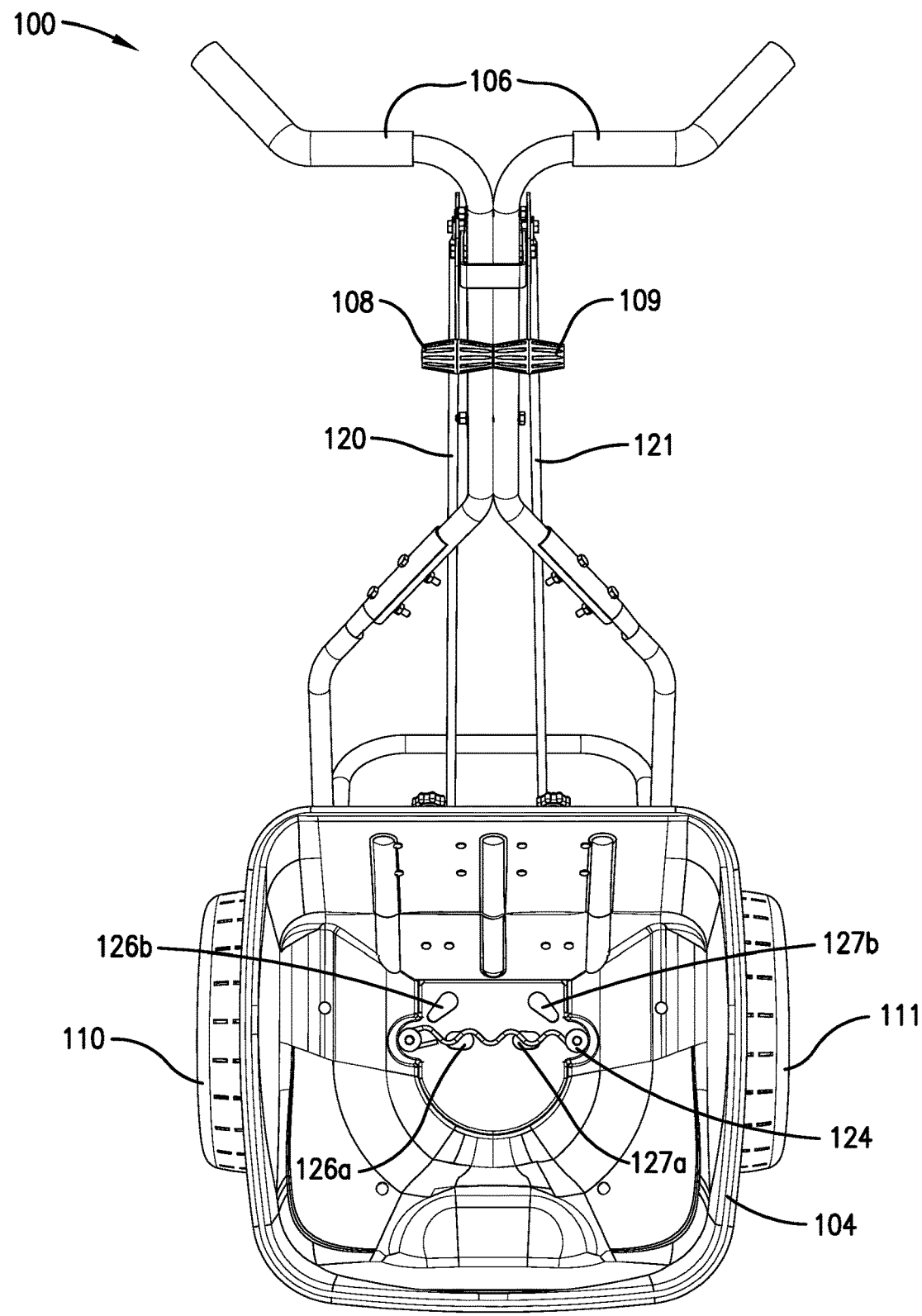
FIG. 6 is a top view of the dual-impeller spreader shown in FIGS. 1-5.
Figure 7:
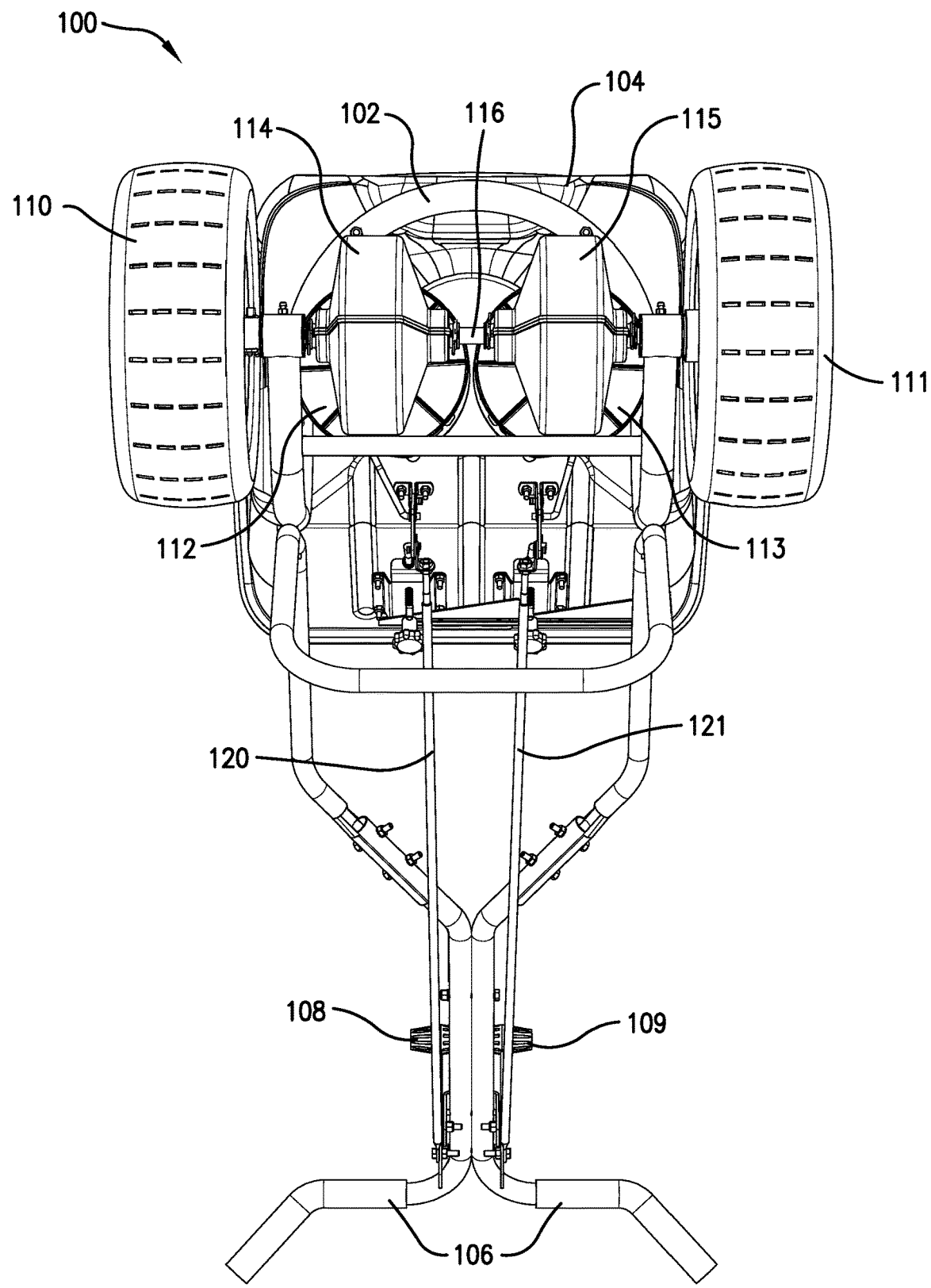
FIG. 7 is a bottom view of the dual-impeller spreader shown in FIGS. 1-6.
Figure 8:
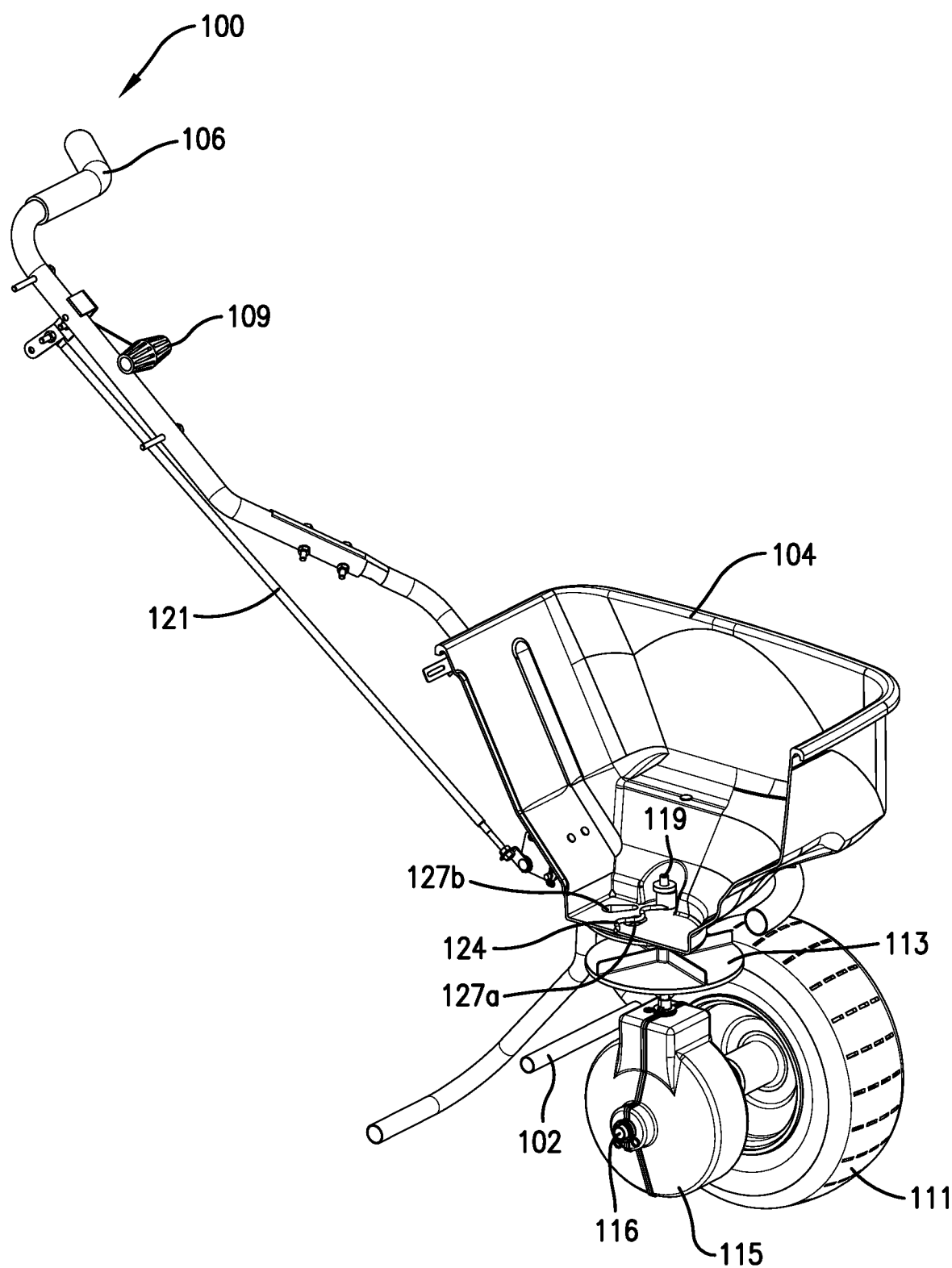
FIG. 8 is a cross-sectional view of the dual-impeller spreader shown in FIGS. 1-7.
Figure 10:
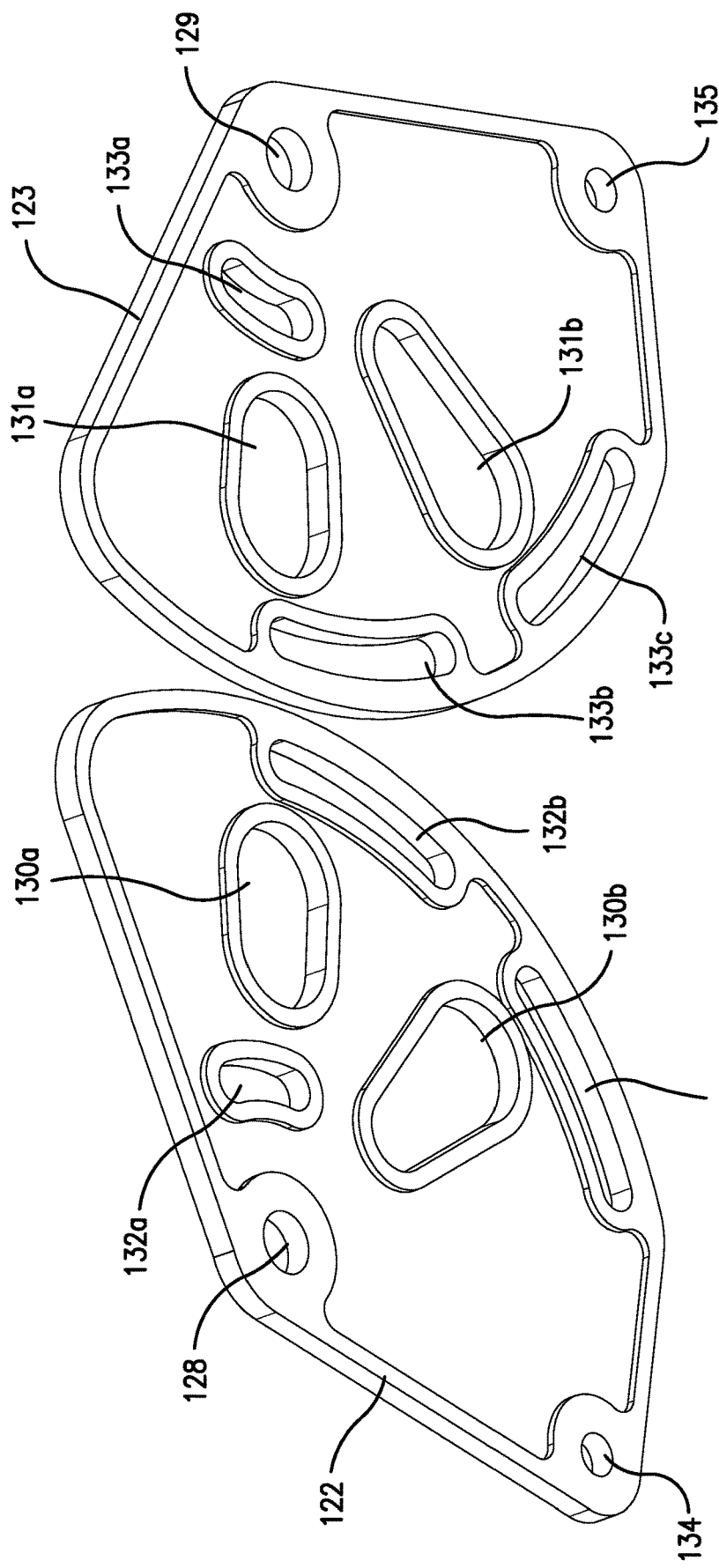
FIG. 10 is a perspective view of the two shut-off adjustment plates shown in FIG. 9.

As best seen in FIGS. 4-5, the shut-off adjustment plates 122, 123 abut the bottom of the hopper 104 in such a way that the shut-off adjustment plates 122, 123 can selectively restrict, obstruct, or fully permit particulate material from exiting the hopper 104. More particularly, the hopper 104 includes a plurality of openings 126, 127 (FIG. 6) in the bottom of the hopper 104 through which particulate material can pass during use. In the illustrated embodiment, the hopper 104 includes four openings for particulate material to pass: two opening 126a, 126b disposed above the first shut-off adjustment plate 122, and two openings 127a, 127b disposed above the second shut-off adjustment plate 123. In other embodiments, the hopper 104 may include, for example, three or even more openings disposed above each respective shut-off adjustment plate, as will be discussed in more detail in connection with FIG. 13. The shut-off adjustment plates 122, 123, in turn, include a corresponding number of exit openings 130, 131 (FIG. 10). Thus, in the illustrated embodiment, the first shut-off adjustment plate 122 includes a first plurality of exit openings 130a, 130b, and the second shut-off adjustment plate 123 includes a second plurality of exit openings 131a, and 131b.

Figure 9:
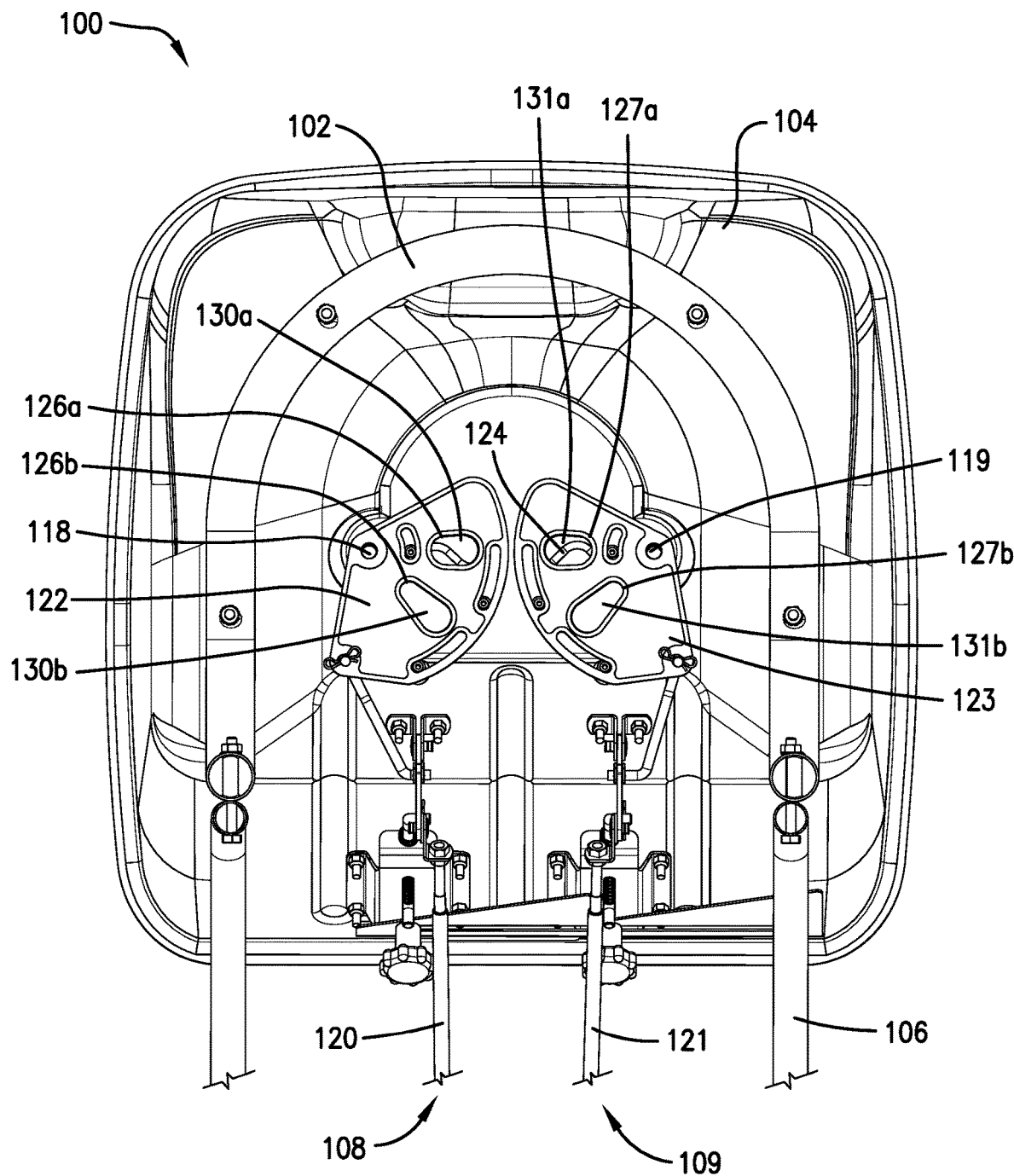
FIG. 9 is a cross-sectional view of a portion of the dual-impeller spreader shown in FIGS. 1-7, showing details of two shut-off adjustment plates attached to the dual-impeller spreader.

Each shut-off adjustment plate 122, 123 is rotatable about the respective impeller shaft 118, 119 via a pivot opening 128, 129 (FIG. 10) from a fully closed position to a fully open position. When in the fully closed position, solid portions of the shut-off adjustment plate 122, 123 completely cover the plurality of openings 126, 127 provided in the hopper 104 so that no particulate material can pass therethrough. When in the fully open position, the plurality of openings 130, 131 in the shut-off adjustment plate 122, 123 are aligned with the plurality of openings 126, 127 provided in the hopper 104 so that particulate material can pass through the plurality of openings 126, 127 unobstructed. For example, and as best seen in FIG. 9, when the first shut-off adjustment plate 122 is in the fully open position, the exit opening 130a aligns with the opening 126a, and the exit opening 130b aligns with the opening 126b. Similarly, when the second shut-off adjustment plate 123 is in the fully open position, the exit opening 131a aligns with the opening 127a, and the exit opening 131b aligns with the opening 127b. When the shut-off adjustment plates 122, 123 are somewhere between the fully open and fully closed positions, solid portions of the plates 122, 123 will partially obstruct the respective plurality of holes 126, 127 so that particulate material is permitted to flow therethrough, albeit at a lower flowrate than when the plates are in the fully open position.

Figure 12:
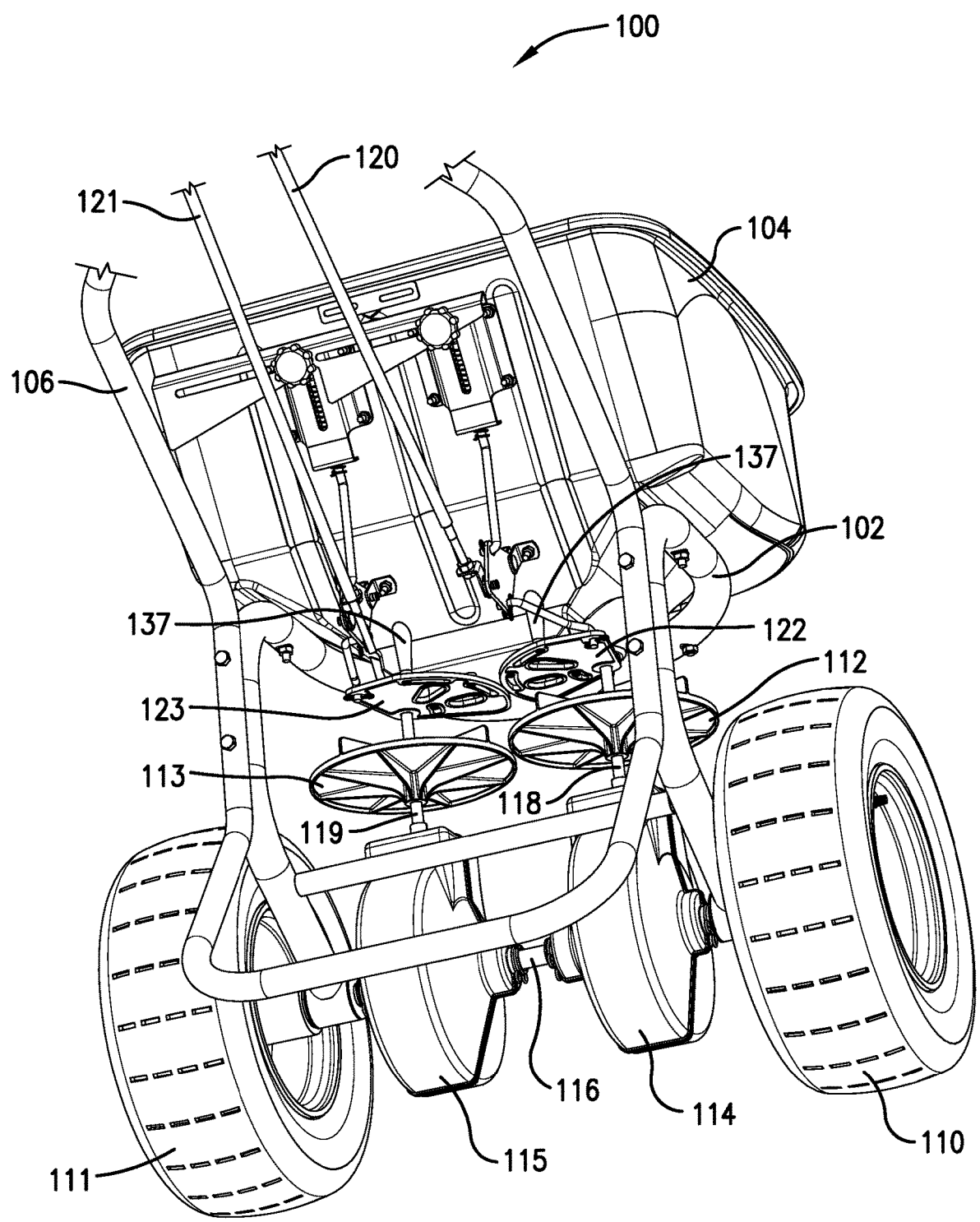
FIG. 12 is a close-up perspective view of the control rod assembly used to open and close the dual shut-off adjustment plates of the dual-impeller spreader shown in FIGS. 1-7.

In some embodiments, the shut-off adjustment plates 122, 123 may include one or more elongated curved openings 132, 133, each of which receives a respective protrusion 137 formed on an underneath side of the hopper 104 (FIG. 12). The protrusions 137 protrude from the underneath side of the hopper 104 and serve as guides to direct the rotational movement of the shut-off adjustment plates 122, 123 as they rotate back and forth. More particularly, as the shut-off adjustment plates 122, 123 pivotably move between the fully closed and fully open positions, the elongated curved openings 132, 133 moved along the stationary protrusions 137. Although not shown, in other embodiments, instead of or in addition to the protrusions 137, the hopper 104 may include a plurality of tapped openings provided above the elongated curved openings 132, 133, and a corresponding fastener extends through the curved openings 132, 133 and into the tapped openings in the bottom of the hopper 104. In such embodiments, the tapped openings may be provided in the protrusions 137, and a flared head of the fastener serves to hold the shut-off adjustment plates 122, 123 next to the hopper 104. Or the hopper 104 may not include the protrusions 137 and instead the fasteners themselves (and more particularly a shaft thereof) can serve as guides to direct the rotational movement of the shut-off adjustment plates 122, 123 as they rotate back and forth in a similar manner as discussed above with respect to the protrusions 137.

Figure 11:
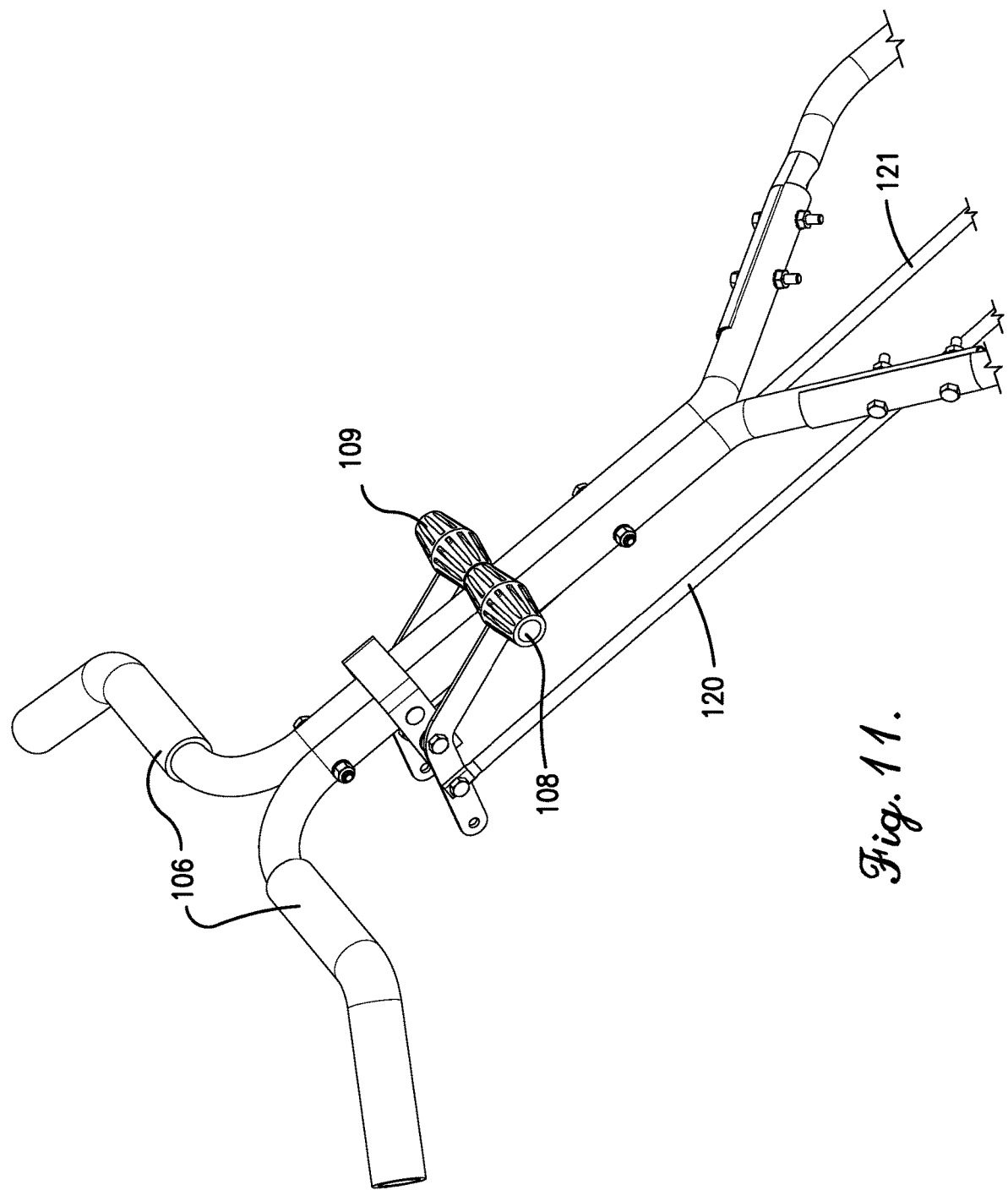
FIG. 11 is a close-up perspective view of the handle assembly including the dual shut-off controls of the dual-impeller spreader shown in FIGS. 1-7.

The control rod assemblies 120, 121 are attached to the shut-off adjustment plates via respective control rod attachment openings 134, 135 at one end and to the respective shut-off control 108, 109 at the opposite end. As best seen in FIGS. 11, and 12, the control rod assemblies may include a series of links, pivot points, and other members that translate movement of the shut-off controls 108, 109 to rotational movement of the shut-off adjustment plates 122, 123 such that the plates rotate about the impeller shafts 118, 119 in response to a user selectively moving the shut-off controls 108, 109.

As best seen in FIG. 11, the shut-off controls 108 and 109 are independently movable with respect to one another, and thus the amount of particulate flowing from the openings 126, 127 is selectively and independently controllable. For example, the shut-off controls are pivotally movable from a forward position (FIG. 11) and a rear position (not shown, but wherein the T-shaped end of the shut-off controls 108, 109 substantially abuts the portion of the push handle 106 grasped by the user during operation). When the shut-off controls 108, 109 are in the forward position, as shown in FIG. 11, the shut-off adjustment plates 122, 123 are in the fully open position (FIG. 9). When the shut-off controls 108, 109 are in the rear position, the shut-off adjustment plates 122, 123 are in the fully closed position. And when the shut-off controls 108, 109 are in between the forward and rear positions, the shut-off adjustment plates 122, 123 partially cover the openings 126, 127 in the hopper 104, and thus obstruct flow of particulate material from the openings 126, 127 to some degree. In other embodiments, the shut-off adjustment plates 122, 123, and the respective control rod assemblies 120, 121 and shut-off controls 108, 109 may be configured such that the shut-off controls 108, 109 operate opposite to how described above: i.e., so that when the shut-off controls 108, 109 are in the rear position, the shut-off adjustment plates 122, 123 are in the fully open position, and when the shut-off controls 108, 109 are in the forward position, the shut-off adjustment plates 122, 123 are in the fully closed position.

Again, the shut-off controls 108, 109 are independently movable with respect to one another so that a user can selectively and independently control the rate of particulate material dispersed from each side of the dual-impeller spreader 100. This will be more readily understood with reference to FIGS. 14-19. First, as best seen in FIG. 14, the gear boxes 114, 115 are configured such that when the spreader is moving in a forward direction, the first impeller 112 spins in a clockwise direction (illustrated by first arrows 172), while the second impeller 113 spins in the opposition direction, i.e., a counterclockwise direction (illustrate by second arrows 174). As used herein, the forward direction refers to a direction in which the dual-impeller spreader 100 moves when a user standing behind the dual-impeller spreader 100 and grasping push handle 106 pushes the dual-impeller spreader 100, while clockwise and counterclockwise refer to the direction of the rotation when the dual-impeller spreader 100 is viewed from above.

Figure 15:
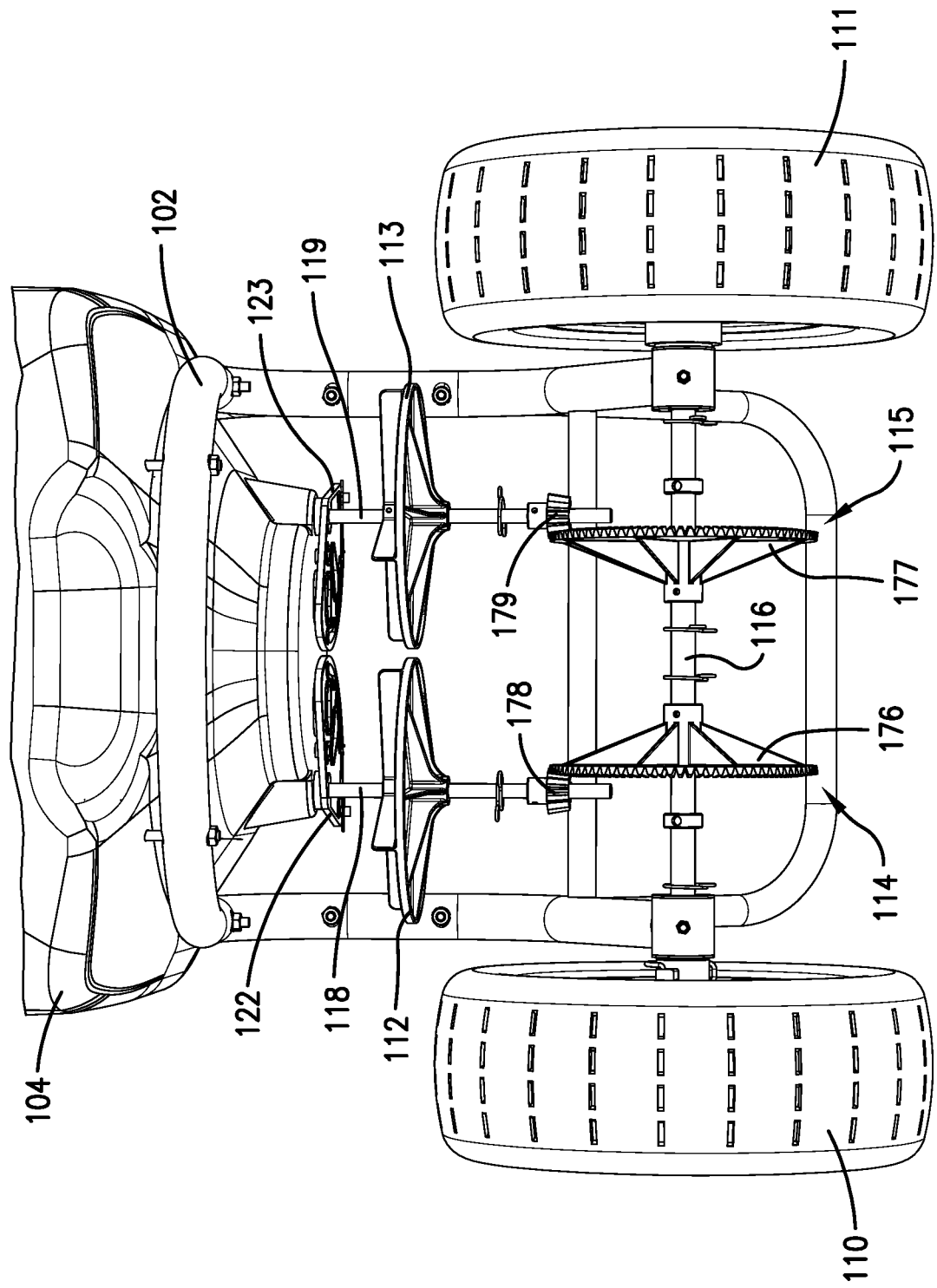
FIG. 15 is a front view of a portion of the dual-impeller spreader shown in FIGS. 1-7 with casings of two gear boxes removed to show the gear train contained therein.

This opposing rotation of the impellers 112, 113 is achieved by placing pinion gears 178, 179 driving the respective impeller shafts 118, 119 on opposite sides of respective axle gears 176, 177 within the gear boxes 114, 115. This is best seen in FIG. 15, in which the lower portion of the spreader is depicted without covers on the gear boxes 114, 115 to show the internal gear trains. Within each gear box 114, 115 is a respective axle gear 176, 177 fixedly secured to the axle 116. In this regard, the axle gears rotate with the axle 116 as the wheels 110, 111 roll along the ground. The first axle gear 176 is meshed with a first pinion gear 178 at an upper end thereof on the right side of the first axle gear 176. The first pinion gear 178 is in turn fixedly mounted to the first impeller shaft 118, to which the first impeller 112 is also fixedly mounted. As the first axle gear 176 rotates in response to the dual-impeller spreader 100 moving along the ground and thus turning the axle 116, the first pinion gear 178 in turn rotates in a clockwise direction when viewed from above (due to its location on the right side of the first axle gear 176), which thus rotates the first impeller 112 in the clockwise direction.

Conversely, the second pinion gear 179 is located to the left of the second axle gear 177, and thus spins in an opposite direction of the first pinion gear 178. More particularly, the second axle gear 177 is meshed with the second pinion gear 179 at an upper end thereof, but on the left side of the first axle gear 177. The second pinion gear 179 is in turn fixedly mounted to the second impeller shaft 119, to which the second impeller 113 is also fixedly mounted. As the second axle gear 177 rotates in response to the dual-impeller spreader 100 moving along the ground and thus turning the axle 116, the second pinion gear 179 in turn rotates in a counterclockwise direction when viewed from above (due to its location on the left side of the second axle gear 177), which thus rotates the second impeller 113 in the counterclockwise direction.

Figure 16:
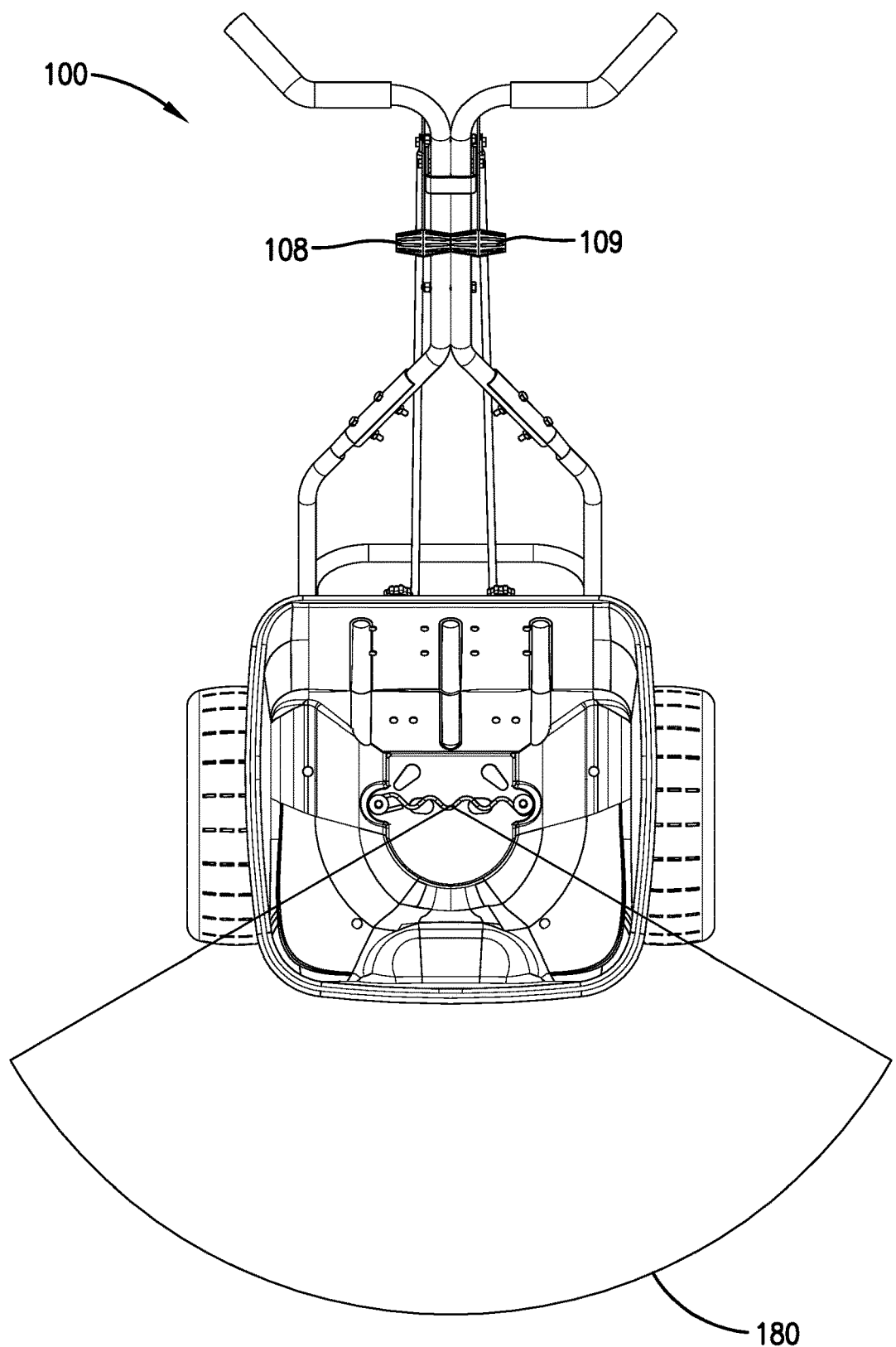
FIG. 16 is a top view of the dual-impeller spreader shown in FIGS. 1-7 and schematically illustrating one spread coverage pattern according to an embodiment of the invention.
Figure 17:
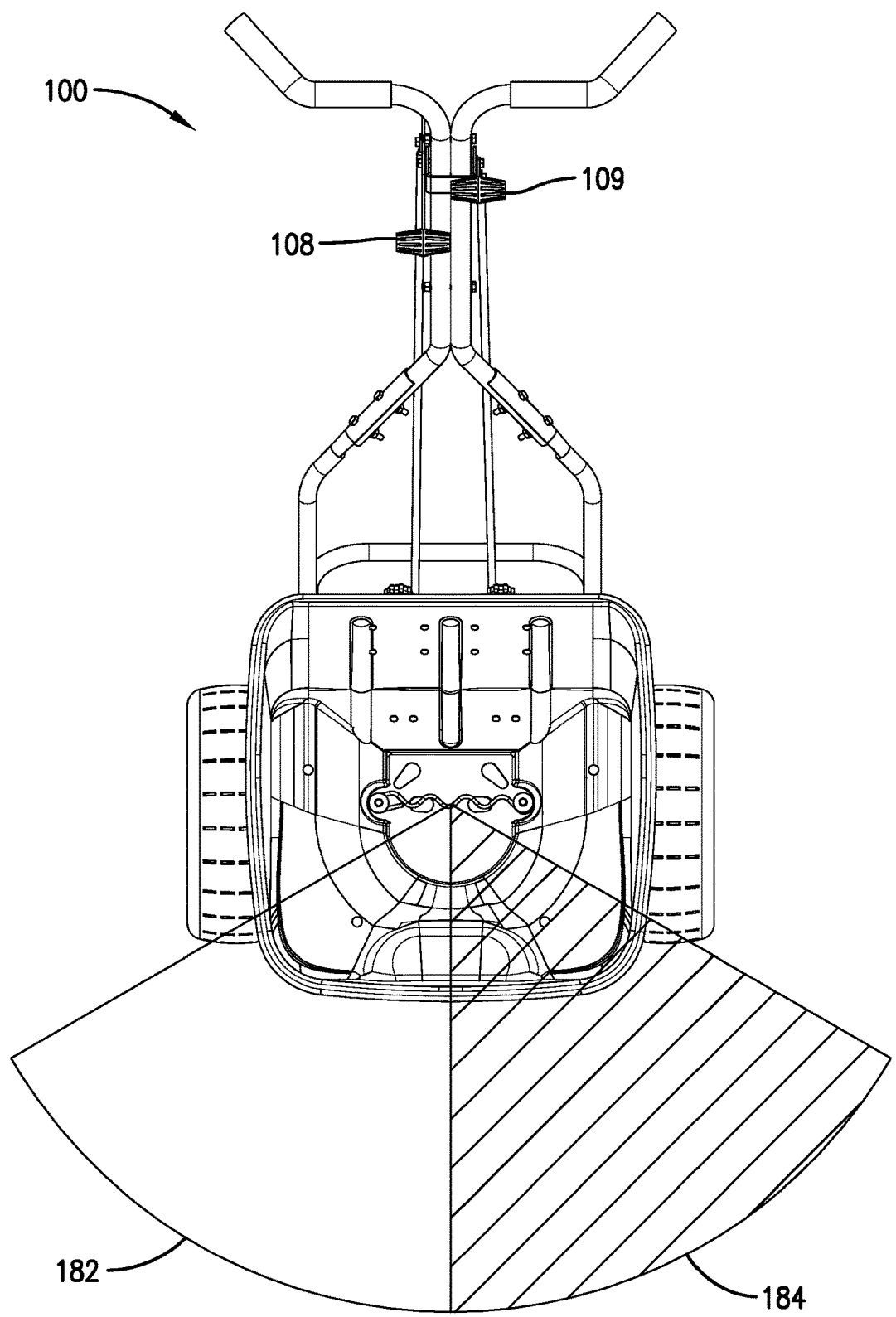
FIG. 17 is a top view of the dual-impeller spreader shown in FIGS. 1-7 and schematically illustrating another spread coverage pattern according to an embodiment of the invention.
Figure 18:
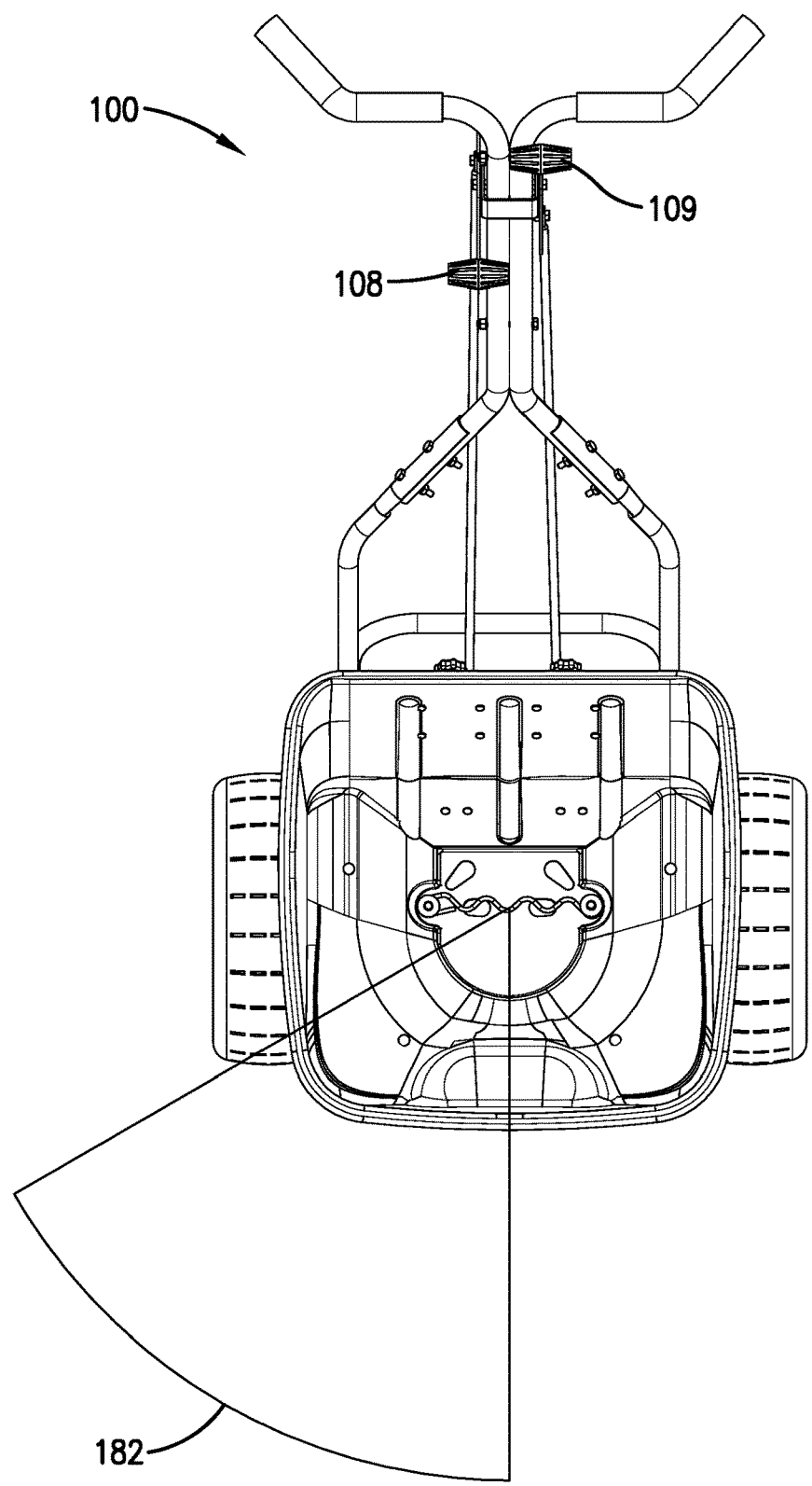
FIG. 18 is a top view of the dual-impeller spreader shown in FIGS. 1-7 and schematically illustrating still another spread coverage pattern according to an embodiment of the invention.
Figure 19:
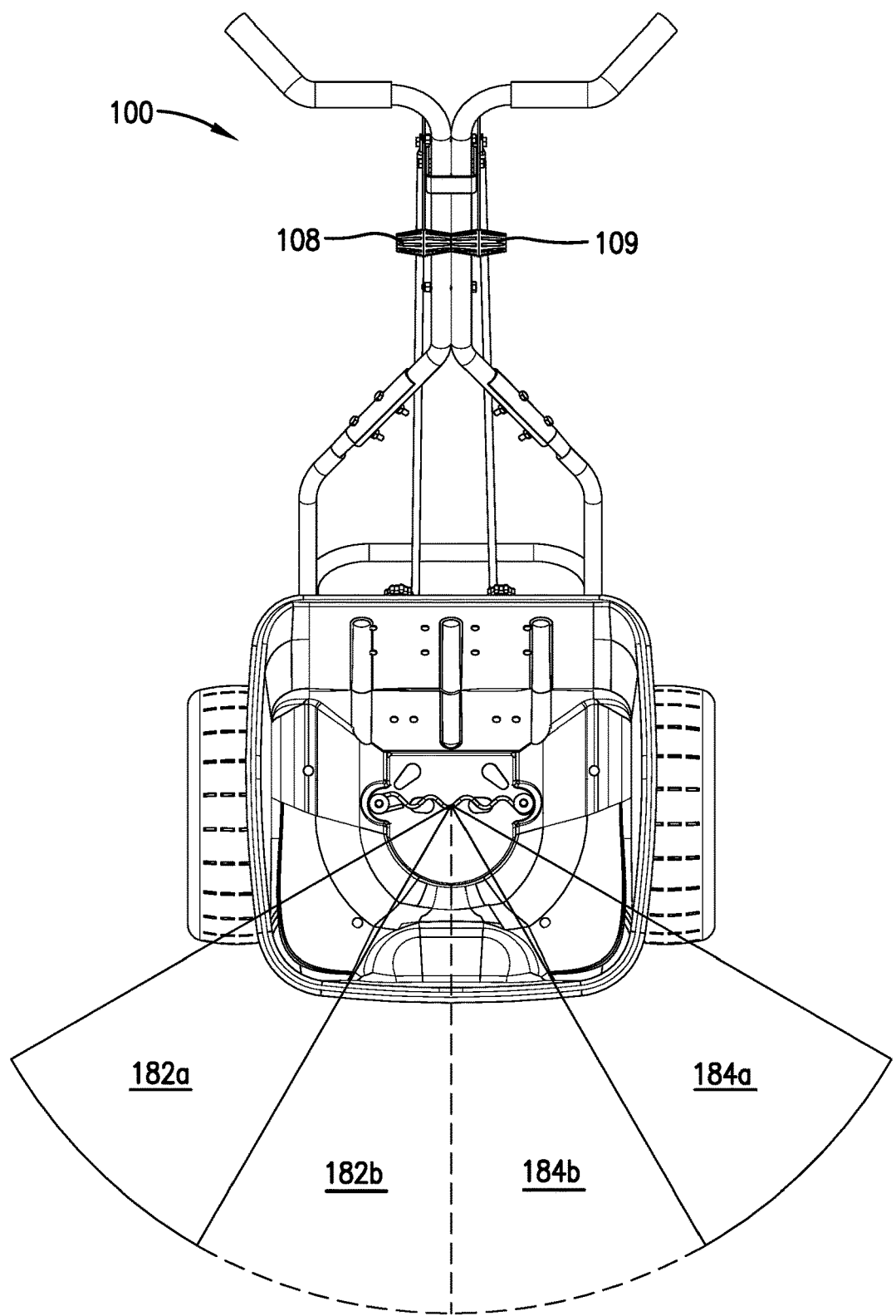
FIG. 19 is a top view of the dual-impeller spreader shown in FIGS. 1-7 and schematically illustrating yet another spread coverage pattern according to an embodiment of the invention.

The novel rotational pattern of the dual spinning impellers 112, 113 results in each impeller contributing to approximately half of the dual-impeller spreader 100's coverage area, as will be understood with reference to FIGS. 16-18. First, FIG. 16 illustrates a full coverage pattern 180; i.e., a coverage pattern when both shut-off controls 108, 109 are at least partially on and in the same position. In this scenario, the entirely of the coverage area 180 will receive an equal amount of particulate material because the shut-off controls 108, 109 (and thus the shut-off adjustment plates 122, 123) are in the same position. Moreover, because the shut-off controls 180, 109 abut each other at the push handle 106, when a user wishes to use the dual-impeller spreader 100 in the full coverage pattern 180, the two shut off controls 108, 109 can easily be moved together (i.e., by the user grasping both with one hand) and thus can easily be moved between the fully closed position and partially or fully open position, as desired.

However, in certain applications the user may not want to evenly distribute the particulate material, and thus can move the shut-off controls 108, 109 independent of each other to achieve a desired application pattern. For example, in FIG. 17 the first shut-off control 108 (and thus first shut-off adjustment plate 122) is still in the fully open position, but the second shut-off control 109 (and thus second shut-off adjustment plate 123) is in a partially closed position, thus still permitting particulate material to pass through openings 127 albeit at a reduced flowrate as compared to the particulate material flowing through openings 126. Due to the location of respective openings 126, 127 and the opposing rotation of the impellers 112, 113 as discussed above, each shut-off adjustment plate 122, 123 and thus each corresponding impeller 112, 113 controls approximately half of the spread coverage. Thus, in this configuration, the spreader will have an uneven application: more fertilizer will be applied to the right half 182 of the coverage area than to the left half 184 (the reduced flowrate is represented by cross-hashing of the left coverage area 184 in FIG. 17). In this regard, if a user desires an application where more or less fertilizer or other particulate material is applied to one half of the coverage area, the user may move adjust the shut-off controls 108, 109 independently of each other to achieve the desired result.

It should be appreciated that the user could also use the shut off controls 108, 109 to completely turn off one side of the dual-impeller spreader 100 and thus only apply particulate material to one half of the full coverage area 180, as shown in FIG. 18. There, the first shut-off control 108 (and thus first shut-off adjustment plate 122) is still in the fully open position, but the second shut-off control 109 (and thus second shut-off adjustment plate 123) is in a fully closed position, thus preventing any particulate material from passing through openings 127. In this regard, particulate material will only be applied to the right coverage area 182, and notably no particulate material will be distributed from the left side of the spreader. Of course, the user could in turn adjust the flowrate applied to the right coverage area 180 by using the first shut-off control 108, further customizing the coverage pattern. The independently controlled shut-off adjustment plates 122, 123 and oppositely spinning impellers 112, 113 thus permits a user to selectively tailor the distribution pattern and flow rates of the particulate material to the application at hand, providing a user increased flexibility and customizability as compared to known spreaders.

According to some aspects, one or both of the shut-off adjustment plates 122, 123 can be equipped with a spread control mechanism such as the spread control mechanisms discussed extensively in U.S. Pat. No. 9,820,430, entitled "Spread Control Mechanism," and U.S. Patent Application Publication No. 2018/0035604, entitled "Spread Control Mechanism," which are hereby incorporated by reference in their entirely. Additionally, other spread adjustment mechanisms may be implemented on the dual-control spreader such as those described in U.S. Pat. No. 9,192,094, entitled "Adaptable Spreader," U.S. Pat. No. 9,198,345, entitled "Adaptable Spreader," or U.S. Pat. No. 10,225,976, entitled "Adaptable Spreader," which are hereby incorporated by reference in their entirely.

Figure 13:
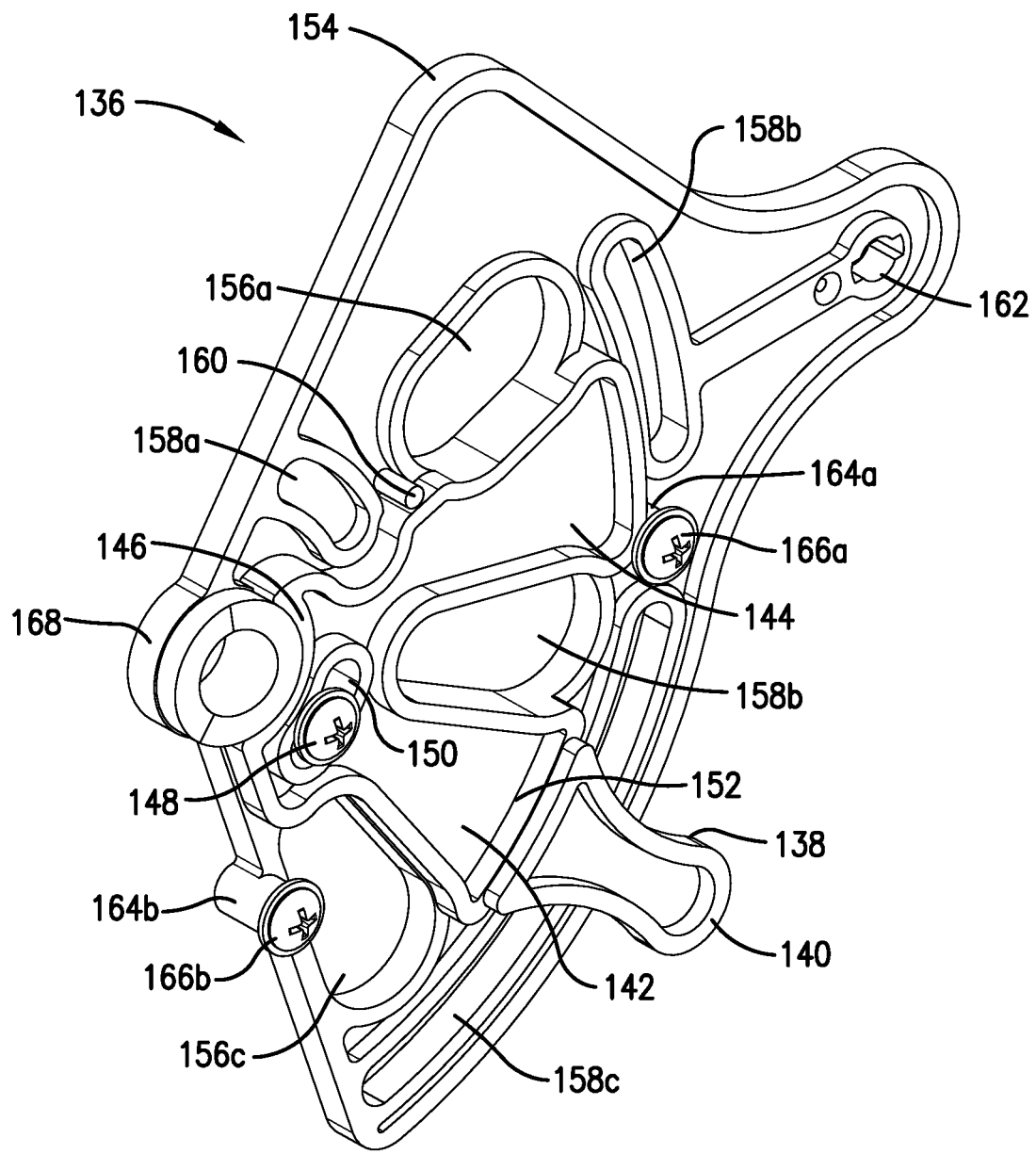
FIG. 13 is a perspective view of a spread control assembly that can be used in connection with the dual-impeller spreader shown in FIGS. 1-7.

More particularly, in some embodiments each impeller shaft 118, 119 can include a spread control assembly 136, which is shown in FIG. 13 in a non-activated (open) state. In the non-activated state, the spread control assembly 136 allows the dispersion of material by the respective impeller 112, 113 in all directions, as will be explained further below. When the spread control assembly 136 in an activated (closed), the spread control assembly 136 impedes the dispersion of particulate material in one side direction and allows the dispersion of material in an opposite side direction while simultaneously reducing the material flowrate. Thus, the spread control assembly 136 is configured to alter a material spread pattern 182, 184 of the respective impeller 112, 113 of the dual-impeller spreader 100. More specifically, the spread control assembly 136, when activated, impedes material from being dispersed through one or more exit openings defined in a shut-off adjustment plate 122, 123. Therefore, a reduced amount of material is dispersed through only those remaining exit openings not covered by a spread control mechanism thereby eliminating product overuse and waste.

In addition, activation of the spread control assembly 136 causes the material to be dispersed outward from one side of the impeller 112, 113 while impeding material from being dispersed out an opposite side of the impeller 112, 113. It is to be understood that the spread control assembly 136 can be configured to impede material dispersion from either side of the impeller 112, 113. Thus, in one example embodiment, the material may be dispersed from a first side (e.g., left or right) and impeded from being dispersed from a second side (e.g., right of left). Therefore, the example embodiment described herein and illustrated in the figures is for illustrative purposes only and is not intended to limit the scope of the innovation.

The spread control assembly 136 includes a spread control mechanism 138, a shut-off adjustment plate 154 (which can be similar in construction to the shut-off adjustment plates 122, 123 discussed above, or which may be modified to include, for example more exit openings 156 as shown in FIG. 13), and a pivot mechanism 168 that pivotally connects the spread control mechanism 138 and the shut-off adjustment plate 154. The spread control mechanism 138 includes a handle 140, multiple paddles including a first paddle 142, a second paddle 144, and a curved pivot engagement portion 146. The curved pivot engagement portion 146 facilitates the pivoting motion of the spread control mechanism 138 about the pivot mechanism 168. The spread control mechanism 300 attaches to the shut-off adjustment plate 154 via a fastener 148 that extends through a slot 150 defined in the spread control mechanism 138. The handle 140 connects to an end 152 of the first paddle 142 that is distal from the pivot mechanism 168. The handle 140 facilitates movement of the spread control mechanism 138 between and an activated (closed) and deactivated (open) state. The spread control mechanism 138 has a V-shaped configuration whereby the first and second paddles 142, 144 are spaced to facilitate application of material.

The shut-off adjustment plate 154 includes the multiple exit openings 156 defined therein and multiple elongated curved openings 158 that serve as hopper attachments openings whereby the shut-off adjustment plate 154 attaches to an outside bottom of the hopper 104 in a similar manner as discussed above with respect to shut-off adjustment plates 122, 123. The shut-off adjustment plate 154 further includes a vertically projecting stop mechanism 160, a control rod attachment opening 162, and multiple hold down bosses 164 that receive fasteners 166 that serve to hold down the spread control mechanism 138.

In the depicted embodiments there are three exit openings 156 defined in the shut-off adjustment plate 154, however in other embodiments the shut-off adjustment plate may have less than three (such as the two openings 130, 131 in each of the shut-off adjustment plates 122, 123 discussed above) or more than three openings. In that regard, there can be any number of exit openings 156 defined in the shut-off adjustment plate 154. In one example embodiment, the number of exit openings 156 is at least one greater than a number of paddles 142, 144. Thus, when the spread control mechanism 138 is activated all but one exit opening 156 will be covered thereby impeding any material from exiting the covered exit openings 156. Therefore, a reduced amount of material will exit the remaining exit openings 156, which directs the material to exit one side of the respective spread pattern 182, 184 of each impeller 112, 113.

When the spread control mechanism 138 is in a non-activated position (as shown), the spread control mechanism 138 is positioned such that all of the exit openings 156 are uncovered. The spread control mechanism 138 is slidably attached through the curved slot 150 via a washer head screw or other suitable device. Thus, the handle 140 may be grasped and moved, thereby urging the spread control mechanism 138 to be moved or slid along the path defined by slot 150 so as to move the spread control mechanism 138 between the activated (closed) and deactivated (open) state. The vertically projecting stop mechanism 160 impedes the spread control mechanism 138 from pivoting past the associated exit openings 156 intended for selective closure.

The pivot mechanism 168 is circular and is integrated into the shut-off adjustment plate 154. The curved pivot engagement portion 146 of the spread control mechanism 138 engages the pivot mechanism 168 to facilitate pivoting of the spread control mechanism 138 with respect to the shut-off adjustment plate 154. Thus, in order to pivot the spread control mechanism 138, the user pivots or rotates the user pivots or rotates the spread control mechanism 138 about the pivot mechanism 168 to the desired position. The pivot mechanism 168 includes a pivot opening 170 for receiving an impeller shaft such as the first impeller shaft 118 or the second impeller shaft 119.

When the spreader described herein is further equipped with a spread control assembly such as the spread control assembly 136 described above or other spread control assembly, the respective spread patterns 182, 184 of each impeller 112, 113 is further customizable according to the particular application. This may be better understood with reference to FIG. 19. There, the spreader includes two shut-off adjustment plates and impellers 112, 113, as discussed above, but is further equipped with a spread control mechanism at each shut-off adjustment plate such as the spread control mechanism 138 discussed above in connection with FIG. 13 or similar. In such embodiments, the user can still independently adjust whether and how much particulate material will be dispensed from each impeller 112, 113 via shut-off controls 108, 109, as discussed. Additionally, however, the user in this embodiment can further control the spread of each impeller 112, 113—i.e., coverage patterns 182 and 184, respectively-via the respective spread control mechanism.

For example, in the depicted embodiment, the user has activated the spread control mechanism at each respective shut-off adjustment plate resulting in a spread pattern that only distributes particulate material to the right of the dual-impeller spreader 100 at the spread coverage area 182*a*, and the left of the dual-impeller spreader 100 at the spread coverage area 184*a*. Notably, by activating the spread control mechanisms the user was able to prevent particulate material from being dispersed in front on the spreader in areas 182*b* and 184*b*. And as should be appreciated given the discussion of FIGS. 16-18, the use could further customize the spread pattern by, for example, dispersing less particulate material in one of the zones 182*a* and 184*a* by partially closing the respective openings 126, 127 in the hopper 104 via shut-off controls 108, 109. Thus, when further equipped when a spread control assembly such as the spread control assembly 136, the dual-impeller spreader 100 is capable of an essentially infinite number of coverage patterns and flowrates, resulting in a fully customizable spreader useful in many applications.

The dual-impeller spreader 100 may be equipped with other features that enable a user to customize the spread area and rates and/or to track how much particulate has been applied using the chosen spread pattern such as the patterns discussed in connection with FIGS. 16-19. For example, in some embodiments the dual-impeller spreader 100 includes a dosing mechanism used to measure specific quantities of material being applied by each impeller 112, 113. In other embodiments, the dual-impeller spreader 100 may include a digital motor or ground driven impeller with analog speed control to assure the impeller speed is always correct regardless of how fast or slow a user pushes the dual-impeller spreader. In other embodiments, the dual-impeller spreader 100 may include a magnetic pickup speedometer to help regulate operator speed to control spread width and application rate. In still other embodiments, the dual-impeller spreader 100 may include a precision spread control modal to control the impeller for proper spread width and a dosing modal to control material flow as the operator walking rate increases and decreases. In other embodiments, dual-impeller spreader 100 can also be GPS enabled to provide guidance as applying, such as maps of application and time required to complete the job, which can help control overlapping or missing areas when spreading. In still other embodiments the dual-impeller spreader 100 can include a mobile phone/tablet mount device to serve as a display and/or a controller for one of the more features described above. And in still other embodiments the dual-impeller spreader 100 can include a communication device or otherwise be able access to the internet for information about fertilizer spread rates and to otherwise interface with the GPS-enabled features described herein.

From the foregoing, it will be seen that this invention is one well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense. Additional objects, advantages, and novel features of the invention will be set forth in part in the description which follows, and in part will become apparent to those skilled in the art upon examination of the following or may be learned by practice of the invention.

What is claimed is:

1. A broadcast spreader comprising:
a frame;
a push handle extending rearward from the frame and configured to be pushed by a user during operation of the spreader;
a hopper connected to the frame and configured to hold particulate material to be spread about a surface;
a plurality of wheels rotatably connected to the frame via an axle and configured to roll along the surface;
a first impeller shaft rotatably coupled to the axle via a first gear train;
a first impeller fixedly coupled to the first impeller shaft and configured to rotate with the first impeller shaft;
a first shut-off adjustment plate positioned between said hopper and said first impeller and configured to adjust an amount of particulate material exiting from said hopper;
a second impeller shaft rotatably coupled to the axle via a second gear train;
a second impeller fixedly coupled to the second impeller shaft and configured to rotate with the second impeller shaft;
a second shut-off adjustment plate positioned between said hopper and said second impeller and configured to adjust an amount of particulate material exiting from said hopper;
a first shut-off control attached to a right side of the push handle;
a second shut-off control attached to a left side of the push handle;
a first, rigid control rod extending from said first shut-off control to said first shut-off adjustment plate and configured to operably connect said first shut-off control with said first shut-off adjustment plate;
a second, rigid control rod extending from said second shut-off control to said second shut-off adjustment plate and configured to operably connect said second shut-off control with said second shut-off adjustment plate;
wherein the first and second impellers are configured to rotate via power provided by the plurality of wheels as the wheels roll along the surface,
wherein, when viewing the broadcast spreader from where a user pushes the spreader in a forward direction during operation, the first impeller is on a right side of the second impeller and, when viewed from above, the first impeller is configured to rotate in a clockwise direction as the broadcast spreader moves in the forward direction and the second impeller is configured to rotate in a counterclockwise direction as the broadcast spreader moves in the forward direction,
wherein the forward direction is a direction of travel of said broadcast spreader during operation, and wherein the first and second impellers are configured to broadcast particulate material in the forward direction and in lateral directions during operation.

2. The broadcast spreader of claim 1, further comprising:
a first gearbox proximate the first impeller shaft and including:
a first axle gear fixedly coupled to the axle; and
a first pinion gear fixedly coupled to the first impeller shaft and meshed to the first axle gear; and
a second gearbox proximate the second impeller shaft and including:
a second axle gear fixedly coupled to the axle; and
a second pinion gear fixedly coupled to the second impeller shaft and meshed to the second axle gear, wherein the first pinion gear is located on a first side of the first axle gear and the second pinion gear is located on a second side of the second axle gear, and wherein the first side is opposite of the second side thereby causing the first impeller to rotate in the clockwise direction and the second impeller to rotate in the counterclockwise direction as the plurality of wheels roll along the surface.

3. The broadcast spreader of claim 1 further comprising:

a first plurality of openings and a second plurality of openings, wherein the broadcast spreader is configured to have a full coverage area when both the first plurality of openings and the second plurality of openings are open, wherein the first impeller is configured to spread particulate material on a first half of the full coverage area when the first plurality of openings are open, and wherein the second impeller is configured to spread particulate material on a second half of the full coverage area when the second plurality of openings are open.

4. The broadcast spreader of claim 3, further comprising:

wherein said first shut-off adjustment plate abuts the first plurality of openings; and wherein said second shut-off adjustment plate abuts the second plurality of openings.

5. The broadcast spreader of claim 4, further comprising:

wherein said first shut-off control is configured to selectively open and close the first plurality of openings provided in the hopper above the first impeller;

wherein said second shut-off control is configured to selectively open and close the second plurality of openings provided in the hopper above the second impeller;

and wherein the first shut-off control and the second shut-off control are movable from a fully open position to a fully closed position, wherein, when the first shut-off control is rotated from the fully open position to the fully closed position, the first control rod assembly causes the first shut-off adjustment plate to rotate and thus open and close the first plurality of openings, and wherein, when the second shut-off control is rotated from the fully open position to the fully closed position, the second control rod assembly causes the second shut-off adjustment plate to rotate and thus open and close the second plurality of openings.

6. The broadcast spreader of claim 3 further comprising:

wherein said first shut-off control is configured to selectively open and close the first plurality of openings provided in the hopper above the first impeller; and wherein said second shut-off control is configured to selectively open and close the second plurality of openings provided in the hopper above the second impeller, wherein the first shut-off control and the second shut-off control are configured to selectively open and close the first plurality of openings and the second plurality of openings, respectively, independent of each other.

7. The broadcast spreader of claim 6, wherein the first shut-off control and the second shut-off control are configured to be selectively moved to a plurality of intermediate positions between a fully open position and a fully closed position, and wherein, when the first shut-off control and the second shut-off control are in one of the plurality of intermediate positions, the first plurality of openings and the second plurality of openings, respectively, are partially obstructed.

8. The broadcast spreader of claim 6 further comprising:

wherein the first shut-off control and the second shut-off control are mounted to the push handle proximate each other such that, when both the first shut-off control and the second shut-off control are either in the fully open position or the fully closed position, the first shut-off control and the second shut-off control abut each other and are configured to be moved together.

\* \* \* \* \*